(12) United States Patent
Simula et al.

(10) Patent No.: US 11,097,590 B2
(45) Date of Patent: Aug. 24, 2021

(54) GAS-ACTUATED STABILIZER BAR SHAFT DECOUPLER

(71) Applicant: Warn Automotive, LLC, Milwaukie, OR (US)

(72) Inventors: Adrian Simula, Livonia, MI (US); Christopher James Boudreau, Estacada, OR (US); Craig Feusse, Fenton, MI (US)

(73) Assignee: WARN Automotive, LLC, Milwaukie, OR (US)

( * ) Notice: Subject to any disclaimer, the term of this patent is extended or adjusted under 35 U.S.C. 154(b) by 202 days.

(21) Appl. No.: 16/258,354

(22) Filed: Jan. 25, 2019

(65) Prior Publication Data

US 2019/0241039 A1  Aug. 8, 2019

Related U.S. Application Data

(60) Provisional application No. 62/625,847, filed on Feb. 2, 2018.

(51) Int. Cl.
*B60G 21/055* (2006.01)
*B60G 17/016* (2006.01)

(52) U.S. Cl.
CPC ..... *B60G 21/0551* (2013.01); *B60G 17/0162* (2013.01); *B60G 21/0556* (2013.01); *B60G 2204/1222* (2013.01); *B60G 2204/422* (2013.01); *B60G 2206/427* (2013.01)

(58) Field of Classification Search
CPC ............ B60G 17/0162; B60G 21/0551; B60G 21/0556; B60G 2206/427; B60G 2204/1222; B60G 2204/422

USPC ................................... 280/124.149, 124.152
See application file for complete search history.

(56) References Cited

U.S. PATENT DOCUMENTS

| | | | | |
|---|---|---|---|---|
| 4,919,444 A * | 4/1990 | Leiber | ................ | B60G 17/0162 280/124.107 |
| 6,149,166 A * | 11/2000 | Struss | ................. | B60G 21/055 267/191 |
| 6,428,019 B1 | 8/2002 | Kincad et al. | | |
| 6,637,757 B2 | 10/2003 | Ignatius et al. | | |
| 6,811,166 B2 | 11/2004 | Carlstedt et al. | | |
| 6,942,227 B2 | 9/2005 | Heller et al. | | |
| 6,994,357 B2 | 2/2006 | Heller et al. | | |
| 7,134,672 B2 | 11/2006 | Beishline et al. | | |
| 7,290,772 B2 | 11/2007 | Taneda et al. | | |
| 7,832,739 B2 * | 11/2010 | Pinkos | ............... | B60G 21/0556 280/5.511 |
| 7,909,339 B2 | 3/2011 | Pinkos et al. | | |
| 8,109,522 B2 | 2/2012 | Pinkos et al. | | |
| 2004/0217569 A1 * | 11/2004 | Gradu | ................ | B60G 21/0555 280/124.107 |
| 2005/0121841 A1 * | 6/2005 | Gradu | ................ | B60G 21/0556 267/186 |
| 2005/0167932 A1 * | 8/2005 | Munster | ............... | B60G 17/025 280/6.15 |
| 2005/0236793 A1 * | 10/2005 | Taneda | ............... | B60G 21/0555 280/124.107 |

(Continued)

*Primary Examiner* — Toan C To
(74) *Attorney, Agent, or Firm* — Fish & Richardson P.C.

(57) ABSTRACT

Methods and systems are provided for controlling operation of a stabilizer bar of a vehicle. In one example, a stabilizer bar includes two shafts joined together by a gas-actuated decoupler. The decoupler may be actuated in order to enable each of the shafts to twist relative to each other.

14 Claims, 10 Drawing Sheets

(56) References Cited

U.S. PATENT DOCUMENTS

2012/0046831 A1* 2/2012 Hidaka .............. B60G 17/0162
  701/38
2018/0043744 A1* 2/2018 Villegas Muriel ...... F16F 1/145

* cited by examiner

GAS-ACTUATED STABILIZER BAR SHAFT DECOUPLER

CROSS REFERENCE TO RELATED APPLICATIONS

The present application claims priority to U.S. Provisional Application No. 62/625,847, entitled "GAS-ACTUATED STABILIZER BAR SHAFT DECOUPLER", and filed on Feb. 2, 2018. The entire contents of the above-listed application are hereby incorporated by reference for all purposes.

FIELD

The present description relates generally to methods and systems for controlling operation of a stabilizer bar of a vehicle.

BACKGROUND AND SUMMARY

Vehicle suspension systems often include one or more wheel stabilizer bars configured to reduce an amount of sway of the vehicle. The wheel stabilizer bars may resist a relative vertical motion of opposing wheels of the vehicle in order to maintain each wheel in contact with the ground surface on which the vehicle is driven. On relatively flat ground surfaces such as roads, the vehicle stabilizer bars may reduce a likelihood of understeering and/or oversteering during conditions in which the vehicle turns, such as along a corner or bend of a road. Vehicles often include stabilizer bars having a stiffness appropriate for the expected driving conditions of the vehicle. For example, vehicles expected to drive primarily on paved roads may have stabilizer bars with a greater stiffness than vehicles expected to drive primarily off-road or on unpaved roads.

However, the inventors herein have recognized potential issues with such systems. As one example, some vehicles may be configured to be driven on a relative wide range of different ground surfaces. However, a stiffness of stabilizer bars included in such vehicles may be pre-determined and may not be adjustable. For example, the stabilizer bars may have a medium stiffness to enable the vehicle to drive on a variety of different ground surfaces, but vehicle handling and/or ride comfort may be degraded due to the stiffness of the stabilizer bars being lower than desirable for driving along paved roads and higher than desirable for driving off-road.

In one example, the issues described above may be addressed by a decoupler for a vehicle wheel stabilizer bar, comprising: a housing forming first and second chambers therein; a diaphragm fluidly isolating the first chamber from the second chamber; a shift fork coupling the diaphragm to a clutch ring disposed within the housing; and a biasing member biasing the shift fork against the clutch ring. In this way, the decoupler may selectably decouple shafts of the stabilizer bar from each other in order to adjust the handling qualities of the vehicle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3-5, FIG. 7, and FIGS. 9-10 are shown to scale, though other relative dimensions may be used, if desired.

DETAILED DESCRIPTION

Figure 1:
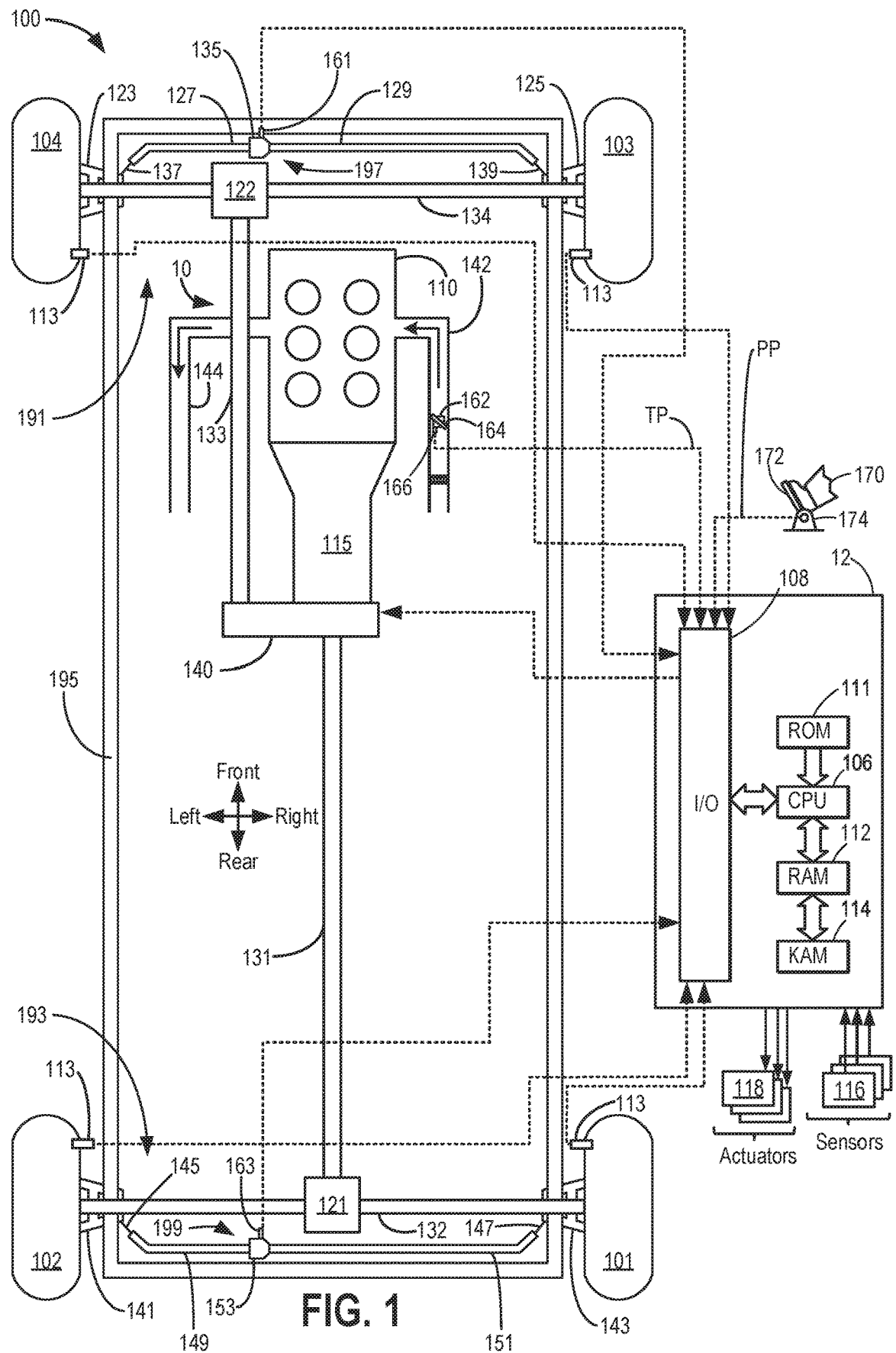
FIG. 1 schematically shows a vehicle including a gas-actuated stabilizer bar shaft decoupler.
Figure 3:
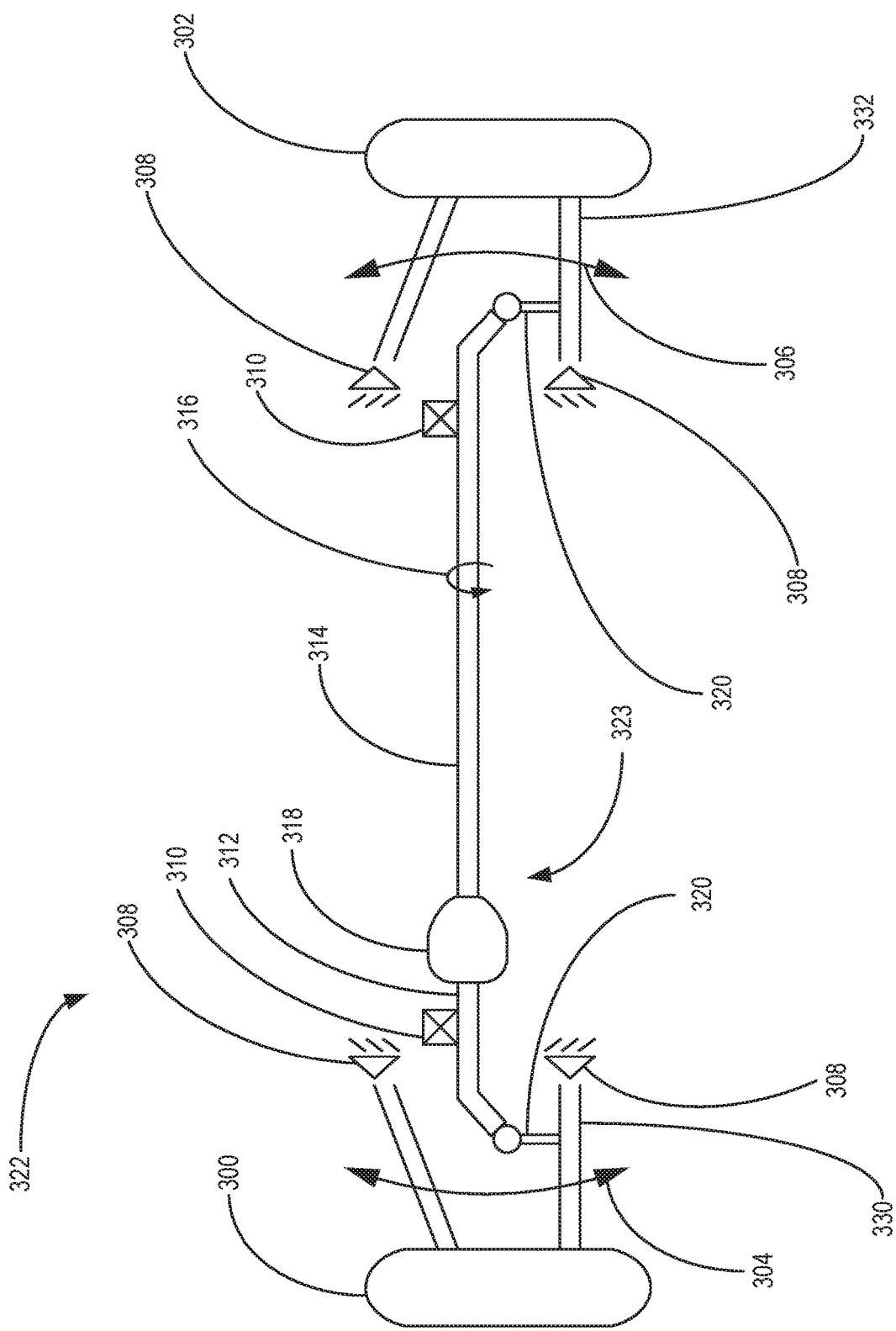
FIG. 3 shows a stabilizer bar of a vehicle and a gas-actuated stabilizer bar shaft decoupler.
Figure 4:
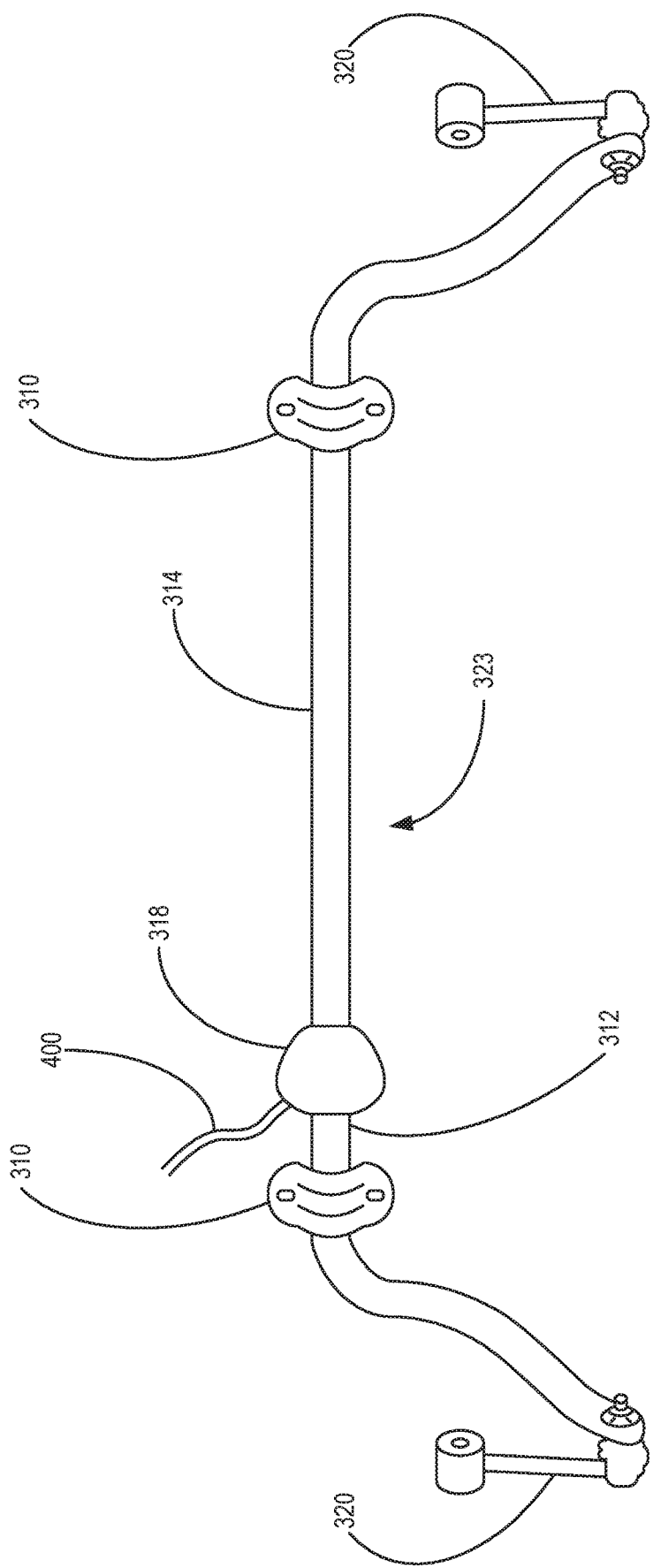
FIG. 4 shows a stabilizer bar of a vehicle and a gas-actuated stabilizer bar shaft decoupler, with the stabilizer bar including mounting brackets and end links.
Figure 8:
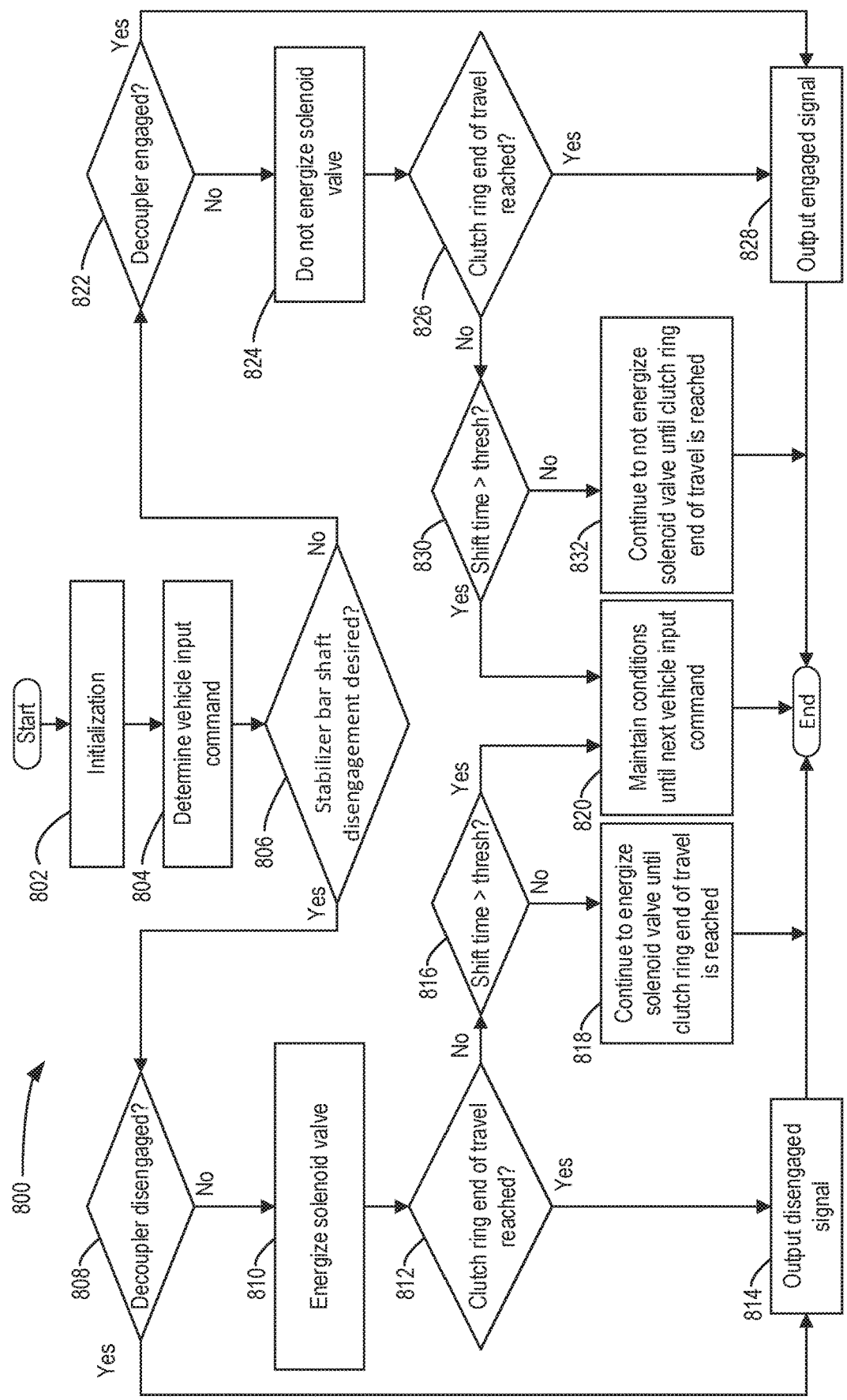
FIG. 8 shows a flowchart illustrating a method for operating a gas-actuated stabilizer bar shaft decoupler.
Figure 9:
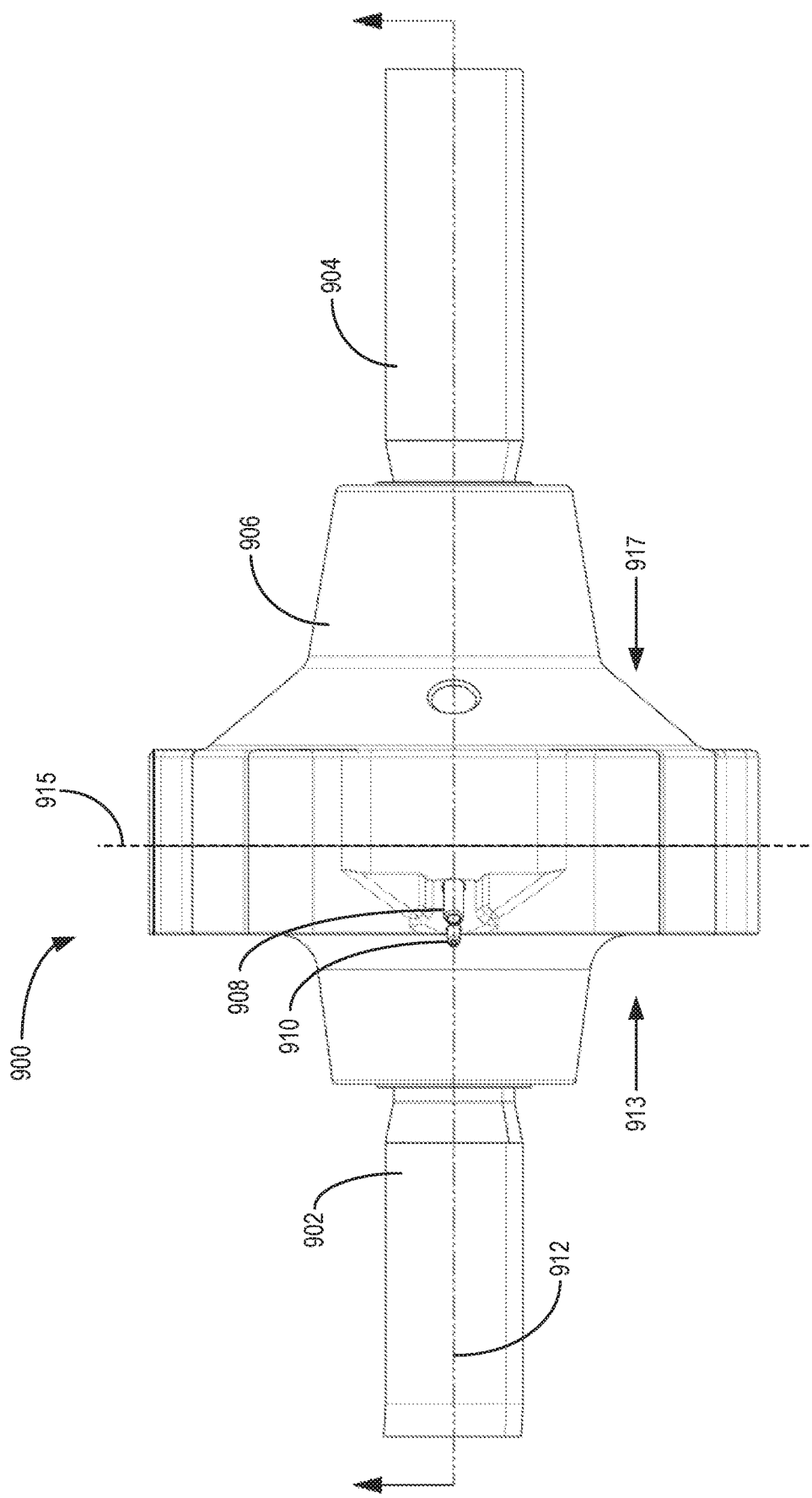
FIG. 9 shows a side view of a third example of a gas-actuated stabilizer bar shaft decoupler.
Figure 10:
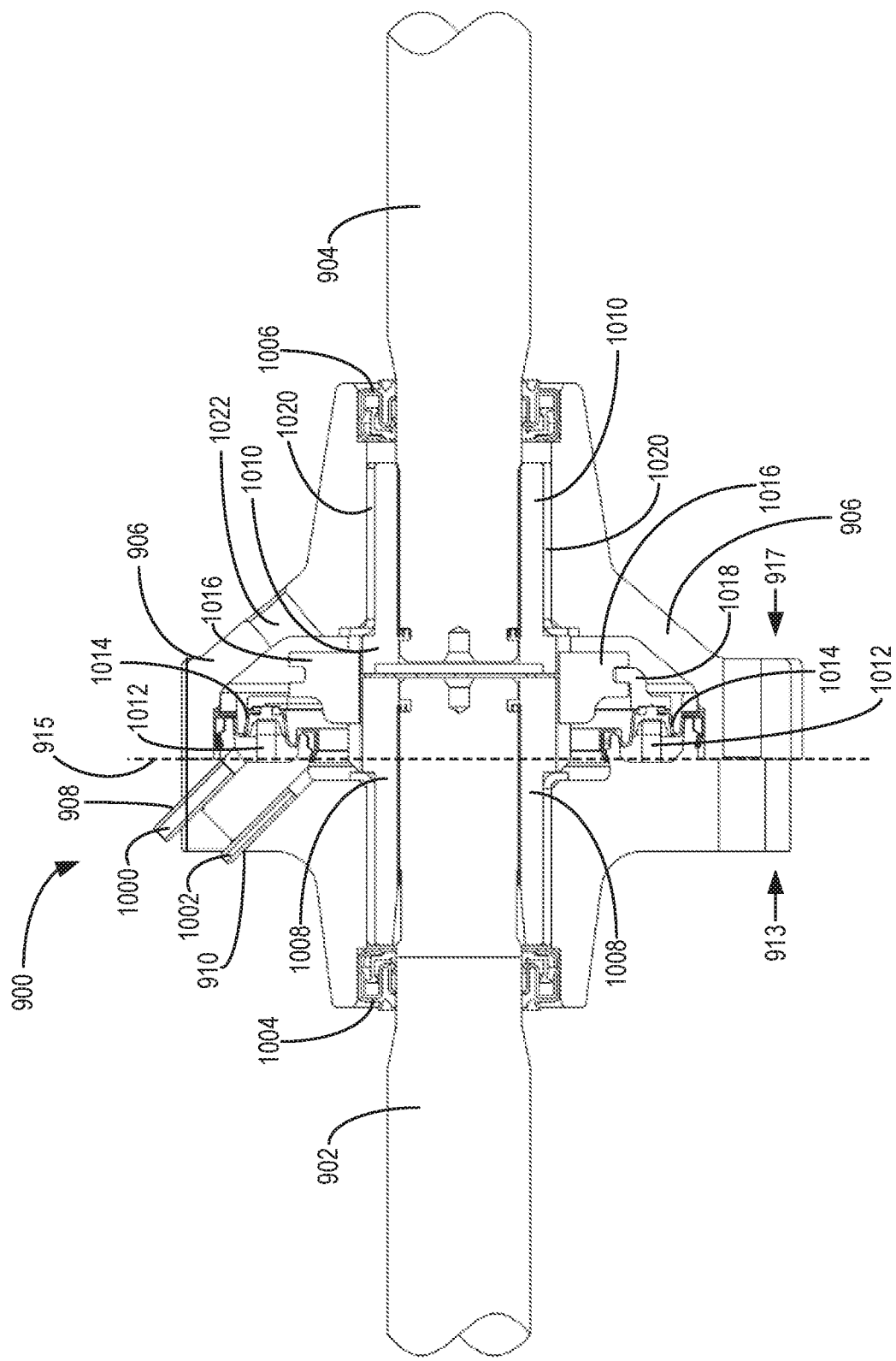
FIG. 10 shows a cross-sectional view of the gas-actuated stabilizer bar shaft decoupler of FIG. 9.

The following description relates to systems and methods for controlling a decoupler of a stabilizer bar of a vehicle. An example of a vehicle including a suspension system having a stabilizer bar is shown by FIG. 1. The stabilizer bar includes two shafts joined by a gas-actuated decoupler as shown by FIGS. 3-4, with a first shaft joined to a control arm of a first wheel and a second shaft joined to a control arm of an opposing, second wheel. One example gas-actuated decoupler is shown by FIGS. 9-10. The decoupler includes at least one chamber that is selectably fluidly coupleable to a vacuum/pressure source such as a vacuum/pressure reservoir by a solenoid valve, as shown schematically by FIG. 2. The vacuum/pressure reservoir may be maintained at a pressure lower than atmospheric pressure or higher than atmospheric pressure by a pump, as shown by FIG. 6. During conditions in which the solenoid valve is energized to fluidly couple the chamber of the decoupler to the vacuum/pressure reservoir, gas exchange occurs between the chamber and the vacuum/pressure reservoir and a pressure of gases within the chamber adjusts to a pressure of gases within the vacuum/pressure reservoir. As a result, a clutch ring of the decoupler, such as the clutch rings shown by FIGS. 5-6, disengages the second shaft from the first shaft and enables the first shaft and second shaft to twist independently of each other. During conditions in which the solenoid valve is not energized, a biasing member applies force to the clutch ring via a shift fork in order to engage the first shaft and second shaft together via the clutch ring. As illustrated by FIG. 8, during some engine operating conditions, an electronic controller of the engine may selectively energize and/or de-energize the solenoid valve in order to adjust operation of the stabilizer bar via the decoupler. As a result, vehicle handling and/or performance may be increased.

Regarding terminology used throughout this detailed description, vehicle operation where only two wheels receive power from the engine may be referred to as two-wheel drive, or 2WD, or 4×2. Alternatively, vehicle operation where all four wheels receive power from the engine may be referred to as four-wheel drive, or 4WD, or 4×4. In other examples, four-wheel drive may be interchangeably referred to as all-wheel drive (AWD), wherein normally unpowered wheels may receive power during certain conditions.

Stabilizer bars, such as those described herein, may be included by a suspension system of a vehicle to reduce a sway or tilt of the vehicle as the vehicle turns or as the vehicle drives along a slope. In some examples, stabilizer bars may be referred to as sway bars, anti-sway bars, anti-roll bars, and the like. A stabilizer bar acts as a torsional spring, coupling opposing sides of the suspension system to each other by using a frame of the vehicle or a body of the vehicle as a pivot point. In this configuration, during conditions in which a vertical force is applied to one of the sides of the suspension system (e.g., conditions in which one of the wheels stabilized by the stabilizer bar is vertically higher or lower than the opposing wheel), the stabilizer bar applies an equal and opposite force to the opposing side of the suspension system, resulting in a relatively same amount of traction at each wheel with respect to the ground surface on which the vehicle sits.

For example, during conditions in which the vehicle sways toward an outside (e.g., upper portion) of a corner (e.g., road corner) as the vehicle turns, the body of the vehicle may tilt in a direction of wheels of the vehicle positioned at the outside of the corner and away from wheels of the vehicle positioned away from the outside of the corner. As the vehicle turns, a relative position of control arms of the wheels positioned at the outside of the corner is vertically higher than control arms of the wheels positioned away from the outside of the corner. As a result, the stabilizer bar is twisted and a torsional spring force acts against the ends of the stabilizer bar to bring the ends toward an equilibrium position. The stabilizer bar applies a vertically downward force on the control arms of the wheels positioned at the outside of the corner, and additionally applies a vertically upward force on the control arms of the wheels positioned away from the outside corner. In this way, the stabilizer bar may reduce an amount of shifting of the center of gravity of the vehicle.

During conditions in which the vehicle is driven off-road, however, enabling each wheel to shift vertically upward or downward independently of each other wheel may increase vehicle handing qualities (e.g., wheel articulation and/or traction) as the vehicle navigates various terrain relative to conditions in which the stabilizer bar applies forces to the wheels as described above. During such conditions, it may be desirable to disengage shafts of the stabilizer bar from each other to enable the wheels of the vehicle to move independently throughout their full range of vertical motion in response to differing terrain conditions at each side of the vehicle (e.g., to increase wheel traction).

As described herein, the stabilizer bar includes a gas-actuated decoupler configured to decouple the shafts of the stabilizer bar from each other in order to enable the wheels of the vehicle to move vertically independently of each other. The gas-actuated decoupler that couples the vehicle's right side suspension to the left side suspension (e.g., via the shafts) includes a housing, flexible diaphragm, shift fork, clutch ring, return spring, bearings and/or bushings, shaft seals, first chamber, second chamber, first port, second port, and a hose. A solenoid valve, pump, check valve, and vacuum/pressure source (which may be a vacuum/pressure reservoir and may be referred to herein as such) may be positioned away from the decoupler in some examples. In other examples, the solenoid valve, pump, check valve, and vacuum/pressure reservoir may be integrated directly with the decoupler (e.g., positioned within or joined with the housing of the decoupler).

During conditions in which the solenoid valve is not energized, the clutch ring engages (e.g., locks) the shafts of the stabilizer bar together and enables the shafts to twist together in response to differences in a vertical position of opposing wheels, as described above. In order to disengage (e.g., unlock) the shafts of the stabilizer bar from each other, the solenoid valve is energized, fluidly coupling one of the first chamber or second chamber of the decoupler to the vacuum/pressure source (which may be a vacuum/pressure reservoir adapted to maintain a pressure of gases stored therein at a pressure above or below atmospheric pressure) via the hose. Fluidly coupling the first chamber or second chamber of the decoupler to the vacuum/pressure reservoir results in a pressure of gases within the corresponding first chamber or second chamber to equalize with the pressure of gases within the vacuum/pressure reservoir. The change in pressure of gases within the first chamber or second chamber results in actuation of the decoupler in order to disengage the shafts of the stabilizer bar from each other, as described below.

In some examples, the pressure of gases within the vacuum/pressure reservoir is maintained at a pressure below atmospheric pressure (e.g., such as 5.5 psi of vacuum relative to atmospheric pressure). For example, the vacuum/pressure reservoir may be emptied of air by the pump. As another example, the vacuum/pressure reservoir may be coupled to an intake manifold of the engine, and flow of gases through the intake manifold may remove air from the vacuum/pressure reservoir. A check valve fluidly coupled to an outlet of the vacuum/pressure reservoir (e.g., the outlet through which air is removed from the vacuum/pressure reservoir) may enable air to flow out of the vacuum/pressure reservoir via the pump or intake manifold and may prevent air from flowing into the vacuum/pressure reservoir via the pump or intake manifold.

During conditions in which the pressure of gases within the vacuum/pressure reservoir is maintained below atmospheric pressure and the vacuum/pressure reservoir is fluidly coupled to the first chamber of the decoupler, air flows from the first chamber to the vacuum/pressure reservoir via the hose. Additionally, the pressure of gases within the second chamber of the decoupler may be maintained at approximately atmospheric pressure. The resulting difference in air pressure between the first chamber and the second chamber of the decoupler causes the diaphragm and shift fork to move in a direction away from the clutch ring (e.g., toward the first chamber) and to compress a biasing member of the decoupler. However, because the shift fork is coupled to the clutch ring, as the diaphragm and shift fork move, the clutch ring also moves toward the first chamber. Moving the clutch ring toward the first chamber disengages internal splines of the clutch ring with splines on one of the shafts of the stabilizer bar, enabling each of the shafts to twist relative to each other. As air flows out of the first chamber to the vacuum/pressure reservoir, air flows into the second chamber via the second port to maintain the second chamber at approximately atmospheric pressure. To maintain the clutch ring in the decoupled state in which the shafts of the stabilizer bar are able to twist independently relative to each other, the solenoid valve is maintained in the energized state, and the pressure of air within the first chamber is maintained at the relatively low pressure (e.g., below atmospheric pressure)

via the vacuum/pressure reservoir (e.g., by flowing air out of the vacuum/pressure reservoir via the pump or intake manifold as described above).

In another example, during conditions in which the pressure of gases within the vacuum/pressure reservoir is maintained above atmospheric pressure (e.g., such as 5.5 psi of pressure above atmospheric pressure, as one example) and the vacuum/pressure reservoir is fluidly coupled to the second chamber of the decoupler, gases flow from the vacuum/pressure reservoir to the second chamber via the hose. Additionally, the pressure of gases within the first chamber may be maintained at approximately atmospheric pressure or at a pressure below atmospheric pressure (e.g., vacuum). In this configuration, the resulting difference in air pressure between the first chamber and the second chamber of the decoupler causes the diaphragm and shift fork to move in a direction away from the clutch ring (e.g., toward the first chamber) and to compress a biasing member of the decoupler, similar to the example described above. As a result, the clutch ring moves toward the first chamber, disengaging the internal splines of the clutch ring with the splines on one of the shafts of the stabilizer bar and enabling each of the shafts to twist relative to each other.

In order to recouple the shafts of the stabilizer bar such that the shafts twist together rather than independently of each other, the solenoid valve is de-energized. As a result, in the configuration in which the gases within the vacuum/pressure reservoir are maintained at the pressure below atmospheric pressure, the first port is fluidly coupled to atmosphere and air flows into the first chamber. As the first chamber is filled with air, air flows out of the second chamber until the first chamber and second chamber are at approximately a same pressure (e.g., air within the second chamber is at approximately a same pressure, such as atmospheric pressure, relative to air within the first chamber). The biasing member applies a restoring force to the shift fork in order to move the clutch ring to the position in which the splines of the clutch ring align with the splines of the shaft of the stabilizer bar (e.g., the splines of the shaft and the splines of the clutch ring fit together in meshing engagement). The splines of the clutch ring may have a first shape, and the splines of the shaft may have a counterpart, second shape, such that the spines of the clutch ring and the shaft engage together in a single, specific orientation (e.g., an orientation in which both of the shafts are in a neutral position and are not twisted relative to each other).

In order to recouple the shafts of the stabilizer bar in the configuration in which the gases within the vacuum/pressure reservoir are maintained at the pressure above atmospheric pressure, the second port and second chamber are fluidly decoupled from the vacuum/pressure reservoir and fluidly coupled to atmosphere. As a result, air flows out of the second chamber via the second port. Additionally, the first chamber and first port may be fluidly coupled to atmosphere such that the pressure of gases within the first chamber and first port is approximately atmospheric pressure. Gases may flow out of the second chamber until the first chamber and second chamber are at approximately a same pressure (e.g., air within the second chamber is at approximately a same pressure, such as atmospheric pressure, relative to air within the first chamber). The biasing member applies a restoring force to the shift fork in order to move the clutch ring to the position in which the splines of the clutch ring align with the splines of the shaft of the stabilizer bar and the shafts engage together.

By configuring the decoupler as described herein, the decoupler automatically engages each of the shafts together (e.g., such that the shafts twist together and do not twist independently of each other) via the biasing force of the biasing member against the shift fork (and the force of the shift fork against the clutch ring) in response to vehicle power loss (e.g., de-energization of the solenoid valve) or degradation of the vacuum/pressure reservoir, pump, second chamber, diaphragm, or first chamber. Further, in some examples, one or more sensors may be included within the decoupler or coupled to the decoupler in order to indicate a state of the decoupler to the electronic controller of the vehicle (e.g., whether the clutch ring is engaging the shafts of the stabilizer bar together, or whether the clutch ring is disengaged and the shafts are able to twist independently of each other).

FIG. 1 schematically shows a vehicle 100 including a powertrain 10, a front suspension system 191, and a rear suspension system 193. In the view shown by FIG. 1, the body of the vehicle 100 along with many other components are not shown in order to better illustrate the powertrain 10, front suspension system 191, and rear suspension system 193. According to the powertrain configuration, the vehicle 100 of FIG. 1 may have a selective 4WD drivetrain, wherein the rear wheels are powered in a rear-wheel drive mode (or 2WD mode) and all four wheels are powered in a 4WD mode, the 4WD drive mode different than the 2WD mode. In other examples, it should be appreciated that the vehicle 100 may incorporate front-wheel drive, and as such, may only transmit power to the front wheels during 2WD, and may then transmit torque to all four wheels during 4WD mode.

In FIG. 1, a right rear wheel 101 and left rear wheel 102 are positioned at the rear of the vehicle 100, that is, the end located behind an operator of the vehicle 100. In this example, left, right, front, and rear orientations are given according to the perspective of an operator 170 of the vehicle 100. Directional arrows for the front, rear, left, and right orientations are shown in FIG. 1. Accordingly, a right front wheel 103 and a left front wheel 104 are positioned at the front of the vehicle 100. As shown in the example of FIG. 1, a wheel speed sensor 113 may be included at one or more of the wheels 101, 102, 103, and 104, for measuring a rotational speed of one or more of the wheels 101, 102, 103, and 104. In some examples, each of the wheels 101, 102, 103, and 104 may include a wheel speed sensor 113, and thus, four wheel speed sensors may be included in the powertrain 10. However, in other examples, more or less than four wheel speed sensors may be included. The wheel speed sensor 113 may provide an indication of the rotational speed of the wheel to which it is coupled to the controller 12. Thus, the controller 12 may estimate a speed of one or more of the wheels 101, 102, 103, and 104 based on signals received from the wheels speed sensor 113.

The front suspension system 191 includes a first control arm 123 coupled to left front wheel 104 and a second control arm 125 coupled to right front wheel 103. The rear suspension system 193 includes a third control arm 141 coupled to left rear wheel 102 and a fourth control arm 143 coupled to right rear wheel 101. The first control arm 123, second control arm 125, third control arm 141, and fourth control arm 143 may each be coupled to frame 195 of the vehicle 100 such that the control arms may pivot relative to the frame 195. For example, each of the control arms may each be coupled to one or more respective struts, shocks, etc. in order to enable the frame 195 to move upward or downward in a vertical direction (e.g., a direction of gravity relative to a ground surface on which the vehicle 100 sits) with respect to the wheels (e.g., left front wheel 104, right front wheel 103, left rear wheel 102, and/or right rear wheel 101).

Front suspension system 191 further includes a front stabilizer bar 197, and rear suspension system 193 includes a rear stabilizer bar 199. The front stabilizer bar 197 and rear stabilizer bar 199 may be referred to herein as sway bars, anti-sway bars, and/or anti-roll bars. Front stabilizer bar 197 includes a first shaft 127 and a second shaft 129, with the first shaft 127 and second shaft 129 each coupled to first gas-actuated decoupler 135. The first shaft 127 and second shaft 129 may be referred to herein as opposing shafts. First shaft 127 is additionally coupled to the first control arm 123 as indicated by line 137, and the second shaft 129 is additionally coupled to the second control arm 125 as indicated by line 139. In some examples, the first shaft 127 and second shaft 129 may be coupled to their respective control arms via end links (e.g., rods including one or more bearings).

The rear stabilizer bar 199 includes a third shaft 149 and a fourth shaft 151, with the third shaft 149 and fourth shaft 151 each coupled to a second gas-actuated decoupler 153. The third shaft 149 is additionally coupled to the third control arm 141 as indicated by line 145, and the fourth shaft 151 is additionally coupled to the fourth control arm 143 as indicated by line 147. In some examples, the first shaft 127 and second shaft 129 may be coupled to their respective control arms via end links (e.g., rods including one or more bearings).

Front stabilizer bar 197 is configured to reduce a vertical movement of left front wheel 104 relative to right front wheel 103, and rear stabilizer bar 199 is configured to reduce a vertical movement of left rear wheel 102 relative to right rear wheel 101. For example, as described above, each of the front stabilizer bar 197 and rear stabilizer bar 199 may act as a torsion spring to reduce an amount of sway (e.g., tilt) of the vehicle 100 during conditions in which the vehicle turns. In one example, turning the vehicle 100 to the right during conditions in which the vehicle is in motion (e.g., traveling in a forward direction of the vehicle 100) may urge the first control arm 123 and the third control arm 141 to pivot downward toward the ground surface due to forces against the vehicle 100 resulting from the centripetal acceleration of the vehicle 100. The urging of the first control arm 123 in the downward direction due to the turning of the vehicle 100 produces torsion against the first stabilizer bar 197, and the urging of the third control arm 141 in the downward direction due to the turning of the vehicle 100 produces torsion against the second stabilizer bar 199. However, due to a stiffness and geometry of the first stabilizer bar 197 and the second stabilizer bar 199, the first stabilizer bar 197 and second stabilizer bar 199 each resist movement resulting from torsion.

Because of the resistance of the first stabilizer bar 197 to movement, during conditions in which the first shaft 127 and second shaft 129 are fixedly coupled together by the first decoupler 135, the first stabilizer bar 197 distributes forces resulting from the acceleration approximately equally to each of the left front wheel 104 and right front wheel 103. Similarly, because of the resistance of the second stabilizer bar 199 to movement, during conditions in which the third shaft 149 and fourth shaft 151 are fixedly coupled together by the second decoupler 153, the second stabilizer bar 199 distributes forces resulting from the acceleration approximately equally to each of the left rear wheel 102 and the right rear wheel 101.

By distributing the forces to the wheels equally as the vehicle 100 turns via the first stabilizer bar 197 and/or second stabilizer bar 199, a handling quality of the vehicle 100 may be increased. For example, during higher vehicle turning speeds (e.g., 50 kilometers per hour) on relatively flat ground surfaces (e.g., roads), the first stabilizer bar 197 and second stabilizer bar 199 may reduce a likelihood of understeering and/or oversteering and may increase a traction of the wheels of the vehicle 100 with the ground surface.

However, during different driving conditions, such conditions in which the vehicle 100 is driven on uneven surfaces (e.g., off-road), it may be desirable to reduce the distribution of forces to the wheels by the first stabilizer bar 197 and/or second stabilizer bar 199. For example, enabling each wheel to shift vertically upward or downward independently of each other wheel may increase vehicle handing qualities (e.g., wheel articulation and/or traction) as the vehicle navigates uneven ground surfaces, as described above. During such conditions, the first decoupler 135 may be actuated in order to decouple the first shaft 127 from the second shaft 129, and/or the second decoupler 153 may be actuated in order to decouple the third shaft 149 from the fourth shaft 151. In the examples described herein, the first decoupler 135 and second decoupler 153 are each gas-actuated decouplers. Examples of gas-actuated decouplers similar to the first decoupler 135 and second decoupler 153 are described in further detail below with reference to FIGS. 2-10.

Although the vehicle 100 is described herein as including both of the first stabilizer bar 197 and second stabilizer bar 199, in other examples vehicle 100 may include only one of the first stabilizer bar 197 or second stabilizer bar 199. Additionally, although the vehicle 100 is described as being powered by engine 110 below, in other examples the vehicle 100 may be propelled by a different type of power source (e.g., an electric motor, such as in an electric vehicle) and/or a combination of power sources (e.g., engine 110 in combination with an electric motor, such as in a hybrid electric vehicle). Further, in examples in which the vehicle 100 includes a combination of power sources, one or more of the sources may be selectably utilized to power the vehicle 100 while one or more other power sources are not selected to power the vehicle 100 (e.g., operating an electric motor to propel the vehicle without propelling the vehicle via the engine, or operating the engine to propel the vehicle without propelling the vehicle via the electric motor).

Vehicle 100 may be controlled at least partially by a control system including controller 12 and by input from vehicle operator 170 via an input device 172. In this example, input device 172 includes an accelerator pedal and a pedal position sensor 174 for generating a proportional pedal position signal PP. Thus, the position of the accelerator pedal of the input device 172 may be determined based on outputs from the pedal position sensor 174. Specifically, the controller 12 may estimate a driver demanded torque based on a position of the input device 172 determined based on signals received from the pedal position sensor 174. In this way, vehicle operator 170 may adjust a torque output by engine 110 by depressing or releasing the accelerator pedal. Specifically, the vehicle operator 170 may request for more torque and acceleration by further depressing the accelerator pedal, and may request for less torque by releasing the accelerator pedal.

Power from the vehicle of FIG. 1 may be generated by the internal combustion engine 110 having multiple cylinders. Engine 110 may receive intake air from an intake passage 142. A throttle 162 including a throttle plate 164 may be arranged in the intake passage 142 to regulate an amount of air flowing to the engine cylinders of engine 110. Specifically, the throttle plate 164 may be adjusted based on the driver demanded torque (e.g., input from vehicle operator 170 via input device 172). More specifically, the controller 12 may determine a desired position of the throttle plate 164 based on one or more of inputs received from the input device 170 and pedal position (PP) signal, a vehicle weight, road incline, transmission gear, etc. In this particular example, the position of the throttle plate 164 may be varied by the controller 12 via a signal provided to an electric motor or actuator included with the throttle 162, a configuration that is commonly referred to as electronic throttle control (ETC). In this manner, the throttle 162 may be operated to vary the intake air provided to the cylinders of the engine 110. More specifically, the throttle 162 may include an electric motor or other suitable actuator, which may be mechanically coupled to the throttle plate 164, for adjusting the position of the throttle plate 164 based on signals received from the controller 12. Thus electrical input to the throttle 162 may be converted to mechanical rotational energy, used to adjust the position of the throttle plate 164, and vary airflow to the engine 110. Products of combustion may then be exhausted to the environment via an exhaust passage 144. The exhaust passage 144 may include one or more catalysts and/or particulate filters for purifying the exhaust gases before they reach the environment.

Engine 110 can be a fueled by gasoline or diesel according to the specific vehicle, and in the present example, engine 110 contains six cylinders configured in a V orientation, forming a V6 engine. It is understood that engine 110 may be configured in different orientations and contain a different number of cylinders while providing power in a similar fashion as seen in FIG. 1. A shaft powered by engine 110 may be directly coupled to a transmission 115 providing the necessary gearing for driving the vehicle. Transmission 115 may be a manual or automatic transmission. A rear drive shaft 131 may be connected to transmission 115 as an output of the transmission, providing power to the rear end of the vehicle.

During the aforementioned 2WD mode of powertrain 10, either wheels 101 and 102 are powered via a rear axle 132, or wheels 103 and 104 are powered via front axle 134. Rear axle 132 and/or front axle 134 may be a single continuous shaft in some embodiments, or may be split into two axles in a bi-axle configuration, wherein the axle is interposed with a differential. In the bi-axle configuration of the rear axle 132, a first rear axle may be positioned between a rear differential 121 and the right rear wheel 101 and a second rear axle may be positioned between the rear differential 121 and the left rear wheel 102. Similarly, in the bi-axle configuration of the front axle 134, a first front axle may be positioned between the front differential 122 and the right front wheel 103 and a second front axle may be positioned between the front differential 122 and the left front wheel 104. The rear differential 121 is also attached to rear drive shaft 131. The rear differential 121 may serve several purposes, including allowing different relative rotational speeds between wheels 101 and 102 and transferring rotation (and power) from a single direction of drive shaft 131 into two perpendicular directions of rear axle 132, as seen in FIG. 1. For example, if the vehicle is turning in the left direction, then the inboard wheel (wheel 102) may rotate at a lower speed than the rotation of the outboard wheel (wheel 101). As such, rear differential 121 may allow the two wheels to rotate at different speeds in order to avoid slipping between the wheels of the vehicle and a road that the vehicle is traveling across during a turn.

For operation of the aforementioned 4WD mode, wherein all four wheels are driven, a system is provided to transfer power to the two wheels not receiving torque during the 2WD mode. Specifically, in a rear-wheel drive mode of the 2WD mode, power is output to the rear wheels 101 and 102, and not the front wheels 103 and 104. When shifting to the 4WD from a rear-wheel drive mode of the 2WD mode, power may be transferred to the front wheels 103 and 104 in addition to the nominally powered rear wheels 101 and 102. In a front-wheel drive mode of the 2WD mode, power may be output to the front wheels 103 and 104, and not to the rear wheels 101 and 102. When shifting to the 4WD mode from a front-wheel drive mode of the 2WD mode, power may be transferred to the rear wheels 101 and 102 in addition to the nominally powered front wheels 103 and 104.

A transfer case 140 may be positioned near the output of transmission 115, and may be configured to direct power from engine 110 to one or more of front drive shaft 133 and rear drive shaft 131. The front drive shaft 133 may also be referred to herein as front propeller shaft 133 and rear drive shaft 131 may also be referred to herein as rear propeller shaft 131. In one embodiment, the transfer case 140 may utilize a chain to transfer power from the transmission 115 to one or more of the rear drive shaft 131 and front drive shaft 133.

In a similar fashion to the rear drive system, the front drive shaft 133 connects to a front differential 122. The front differential 122 may be substantially the same as rear differential 121, in that the front differential 122 allows relative rotational speeds of two wheels. As such, the front axle 134, which may be divided into two axles of a bi-axle system, may be attached to differential 122 on one end and to its respective left front wheel 104 and right front wheel 103. In this configuration, drive power from front drive shaft 133 may be transferred through front differential 122 and to wheels 103 and 104 via front axle 134. Since transfer case 140 allows power to be outputted to both the front and rear axles, the 4WD mode may allow all four wheels to be powered simultaneously. Said another way, when the vehicle is in the 4WD mode, both the front wheels 103 and 104 and rear wheels 101 and 102 may be driven. The vehicle may include one or more disconnects configured to switch the vehicle from 4WD mode to 2WD mode, or vice versa.

Controller 12 is shown in FIG. 1 as a microcomputer, including microprocessor unit 106, input/output ports 108, an electronic storage medium for executable programs and calibration values shown as non-transitory read only memory chip 111 in this particular example for storing executable instructions, random access memory 112, keep alive memory 114, and a data bus. Controller 12 may receive various signals from sensors coupled to powertrain 10, in addition to those signals previously discussed, including measurement of inducted mass air flow (MAF) from a mass air flow sensor, throttle position (TP) from the throttle position sensor 166, accelerator pedal position from pedal position sensor 174, a state (e.g., engaged or disengaged mode) of first decoupler 135 from position sensor 161, and a state (e.g., engaged or disengaged mode) of second decoupler 153 from position sensor 163.

The controller 12 receives signals from various sensors 116 and employs various actuators 118 to adjust engine and/or powertrain operation based on the received signals and instructions stored on a memory of the controller. The sensors 116 may include the sensors already described such as throttle position sensor 166, pedal position sensor 174, and wheel speed sensor 113, and may include additional sensors such as drive shaft speed, acceleration, yaw, brake pressure, vehicle speed, and steering angle sensors. The actuators 118 may include various electronically controlled actuators, such as motors, electromagnetic coils, vacuum actuators, etc. The actuators 118 may be included in the suspension systems to adjust the operation thereof. For example, each of the first suspension system 191 and second suspension system 193 may include respective solenoid valves configured to adjust operation of the first decoupler 135 and second decoupler 153, respectively, for shifting the first decoupler 135 and second decoupler 153 between engaged and disengaged modes, similar to the examples described with reference to FIGS. 2-10, and as described above.

As described above, in some examples, vehicle 100 may be a hybrid vehicle with multiple sources of torque available to one or more vehicle wheels. In other examples, vehicle 100 is a conventional vehicle with only an engine, or an electric vehicle with only electric machine(s). In the example shown, vehicle 100 includes engine 110 and an electric machine. The electric machine may be a motor or a motor/generator. A crankshaft of engine 110 and the electric machine are connected via the transmission to the vehicle wheels when one or more clutches are engaged. For example, a first clutch may be provided between the crankshaft and the electric machine, and a second clutch may be provided between the electric machine and the transmission. Controller 12 may send a signal to an actuator of each clutch to engage or disengage the clutch, so as to connect or disconnect the crankshaft from the electric machine and the components connected thereto, and/or connect or disconnect the electric machine from the transmission and the components connected thereto. The transmission may be a gearbox, a planetary gear system, or another type of transmission. The powertrain may be configured in various manners including as a parallel, a series, or a series-parallel hybrid vehicle.

The electric machine may receive electrical power from a traction battery to provide torque to the vehicle wheels. The electric machine may also be operated as a generator to provide electrical power to charge battery, for example during a braking operation.

Figure 2:
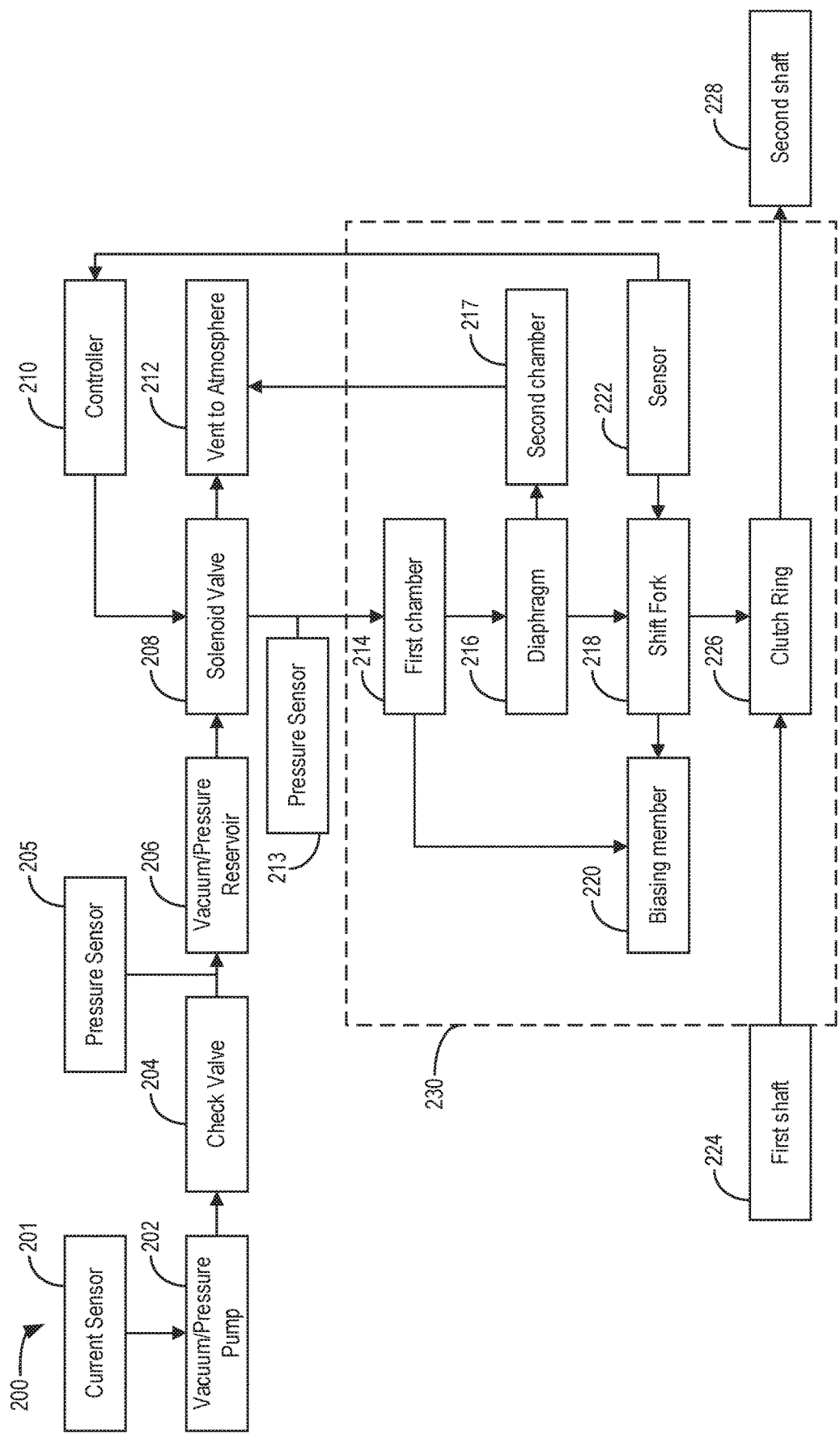
FIG. 2 shows a block diagram illustrating relative connections of components of a vehicle including a gas-actuated stabilizer bar shaft decoupler.

FIG. 2 shows a block diagram 200 illustrating relative connections of components of a vehicle including a gas-actuated stabilizer bar shaft decoupler 230. In one example, the vehicle may be similar to vehicle 100 described above with reference to FIG. 1, and the decoupler 230 may be similar to the first decoupler 135 and/or second decoupler 153 shown by FIG. 1 and described above. Further, several other components shown by the block diagram 200 may be similar to those described above with reference to FIG. 1. For example, controller 210 may be similar to controller 12, first shaft 224 may be similar to first shaft 127 and/or third shaft 149, second shaft 228 may be similar to second shaft 129 and/or fourth shaft 151, may be similar to first stabilizer bar 197 and/or second stabilizer bar 199, and sensor 222 may be similar to position sensor 161 and/or position sensor 163.

Controller 210 is electrically coupled to solenoid valve 208 and may transmit signals (e.g., electrical signals) to the solenoid valve 208 in order to adjust operation of the solenoid valve 208. For example, controller 210 may transmit electrical signals to the solenoid valve 208 in order to adjust the solenoid valve 208 to an opened position (e.g., by energizing the solenoid valve) or a closed position (e.g., by de-energizing the solenoid valve). In some examples, controller 210 may communicate wirelessly with solenoid valve 208 and/or sensor 222.

Solenoid valve 208 includes a port fluidly coupled to atmosphere, as indicated at 212. During conditions in which the solenoid valve 208 is not energized, the solenoid valve 208 does not fluidly couple first chamber 214 (which may be referred to herein as a housing cavity and/or pressure chamber) to vacuum/pressure reservoir 206 (which may be referred to herein as a vacuum/pressure source), and solenoid valve 208 may fluidly couple the first chamber 214 to atmosphere. First chamber 214 is a first chamber of the decoupler 230, similar to the examples described above. Pressure sensor 213 may be coupled between solenoid valve 208 and first chamber 214 and may measure a pressure of gases within first chamber 214. For example, the pressure sensor 213 may output a signal (e.g., electrical signal) to the controller 210 in order to indicate the pressure of gases within the first chamber 214. However, during conditions in which the solenoid valve 208 is energized, the solenoid valve 208 fluidly couples the first chamber 214 to the vacuum/pressure reservoir 206. The vacuum/pressure reservoir 206 may include gases (e.g., air) maintained at a pressure below atmospheric pressure. Fluidly coupling the first chamber 214 with the vacuum/pressure reservoir 206 during such conditions flows gases out of the first chamber 214 and into the vacuum/pressure reservoir 206 due to the pressure of gases within the vacuum/pressure reservoir 206 being maintained at a lower pressure than gases within the first chamber 214.

In one example, gases may be removed from the vacuum/pressure reservoir 206 to reduce the pressure within the vacuum/pressure reservoir 206 via vacuum/pressure pump 202, and check valve 204 may reduce a likelihood of gases flowing back into the vacuum/pressure reservoir 206 from vacuum/pressure pump 202. Pressure sensor 205 may be positioned between the check valve 204 and vacuum/pressure reservoir 206 in order to measure a pressure of gases within the vacuum/pressure reservoir 206. For example, the pressure sensor 205 may output a signal (e.g., electrical signal) to the controller 210 in order to indicate the measured pressure of the vacuum/pressure reservoir 206. Vacuum/pressure pump 202 may be coupled to current sensor 201, and current sensor 201 may measure an amount of electrical current supplied to the vacuum/pressure pump 202. For example, controller 210 may receive signals (e.g., electrical signals) output by the current sensor 201 and may determine the electrical current supplied to the vacuum/pressure pump 202 based on the signals. The controller 210 may additionally determine a speed of the vacuum/pressure pump 202 as a function of electrical current supplied to the vacuum/pressure pump 202 and/or one or more lookup tables stored in non-transitory memory of the controller 210, with an input of the lookup tables being electrical current and an output of the lookup tables being pump speed. In some examples, vacuum/pressure pump 202 may be a different source of vacuum, such as an intake manifold of an engine. Further, the vacuum/pressure pump 202, vacuum/pressure reservoir 206, check valve 204, and solenoid valve 208 may be supported on-board the vehicle including the decoupler 230, such as vehicle 100. In one example, one or more of the vacuum/pressure pump 202, vacuum/pressure reservoir 206, check valve 204, and solenoid valve 208 are positioned external to a housing of the decoupler 230. In other examples, one or more of the vacuum/pressure pump 202, vacuum/pressure reservoir 206, check valve 204, and solenoid valve 208 may be integrated within the housing of the decoupler 230.

The decoupler 230 includes a diaphragm 216 (which may be a flexible diaphragm) positioned within the first chamber 214 and coupled to shift fork 218. Diaphragm 216 fluidly isolates the first chamber 214 from second chamber 217 (which may be referred to herein as a housing cavity and/or pressure chamber). Shift fork 218 is coupled to biasing member 220 (e.g., a return spring), and sensor 222 may measure a position of the shift fork 218 and transmit signals to the controller 210 indicating the position of the shift fork 218. Shift fork 218 is further coupled to clutch ring 226 such that the clutch ring 226 is biased by the shift fork 218 due to the biasing member 220.

During conditions in which the solenoid valve 208 is de-energized, splines of clutch ring 226 engage with counterpart splines of the second shaft 228 due to the biasing of the clutch ring 226 in the direction away from the first shaft 224 by the shift fork 218 and biasing member 220. Further, decoupler 230 is fixedly coupled to the first shaft 224 such that the decoupler 230 does not move relative to the first shaft 224. Because the splines of the clutch ring 226 are engaged with the splines of the second shaft 228, the decoupler 230 locks the first shaft 224 to the second shaft 228 such that a motion of the first shaft 224 results in a motion of the second shaft 228. Similarly, forces applied to the first shaft 224 (e.g., twisting forces) result in forces applied to the second shaft 228. This configuration may be referred to herein as an engaged mode of the decoupler 230.

However, during conditions in which the solenoid valve 208 is energized and the gases within the vacuum/pressure reservoir 206 are maintained at the pressure below atmospheric pressure as described above, the first chamber 214 is fluidly coupled to the vacuum/pressure reservoir 206, and gases flow out of the first chamber 214 to the vacuum/pressure reservoir 206. As a result of the decreased gas pressure within the first chamber 214, the pressure of gases within the second chamber 217 (e.g., gases at atmospheric pressure) apply a force to the shift fork 218 via the diaphragm 216 in a direction opposite to the biasing force of the biasing member 220. When the force applied to the shift fork 218 by the gases within the second chamber 217 exceed the biasing force of the biasing member 220, the shift fork 218 is moved toward the first chamber 214 and the splines of the clutch ring 226 are disengaged with the splines of the second shaft 228. As a result, the second shaft 228 is able to move (e.g., twist) relative to the first shaft 224. This configuration may be referred to herein as a disengaged mode of the decoupler 230.

As another example configuration, the second chamber 217 may instead be coupled to the vacuum/pressure reservoir 206 by the solenoid valve 208 and the first chamber 214 may be coupled to atmosphere. The vacuum/pressure reservoir 206 may include gases (e.g., air) maintained at a pressure higher than atmospheric pressure. For example, the vacuum/pressure pump 202 may deliver compressed air to the vacuum/pressure reservoir 206, with the compressed air being at a higher pressure than atmospheric pressure. In order to actuate the decoupler 230 to disengage the second shaft 228 from the first shaft 224 in this configuration, the solenoid valve 208 may be moved to the opened position in order to flow gases from the vacuum/pressure reservoir 206 to the second chamber 217. Flowing the gases to the second chamber 217 increases the pressure of gases within the second chamber 217 above atmospheric pressure. Because the gases within the first chamber 214 may be maintained at approximately atmospheric pressure in this configuration, the pressure differential between the first chamber 214 and second chamber 217 results in a force applied to the shift fork 218 via the diaphragm 216 in a direction opposite to the biasing force of the biasing member 220, similar to the example described above. When the force applied to the shift fork 218 by the gases within the second chamber 217 exceeds the biasing force of the biasing member 220, the shift fork 218 is moved toward the first chamber 214 (e.g., in the direction of the first shaft 224) and the splines of the clutch ring 226 are disengaged with the splines of the second shaft 228. As a result, the second shaft 228 is able to move (e.g., twist) relative to the first shaft 224.

In yet another example configuration, the first chamber 214 and second chamber 217 may each be coupled to separate vacuum/pressure reservoirs similar to the vacuum/pressure reservoir 206. For example, first chamber 214 may be coupled to a first vacuum/pressure reservoir including gases maintained at a pressure below atmospheric pressure (e.g., the intake manifold of the vehicle) and the second chamber 217 may be coupled to a second vacuum/pressure reservoir including gases maintained at a pressure above atmospheric pressure (e.g., a reservoir configured to receive compressed air from an air compressor of the vehicle). The solenoid valve 208 may be configured to fluidly separate the first chamber 214 from the first vacuum/pressure reservoir and to additionally fluidly separate the second chamber 217 from the second vacuum/pressure reservoir. In this configuration, during conditions in which the solenoid valve 208 is in the closed position, the first chamber 214 may be fluidly isolated from the first vacuum/pressure reservoir and the second chamber 217 may be fluidly isolated from the second vacuum/pressure reservoir such that gases do not flow from the first chamber 214 to the first vacuum/pressure reservoir (or vice versa) and gases do not flow from the second chamber 217 to the second vacuum/pressure reservoir (or vice versa). Further, during conditions in which the solenoid valve 208 is in the closed position, the first chamber 214 and second chamber 217 may each be fluidly coupled to atmosphere, such that a pressure of gases within the first chamber 214 and second chamber 217 is approximately atmospheric pressure.

However, during conditions in which the solenoid valve 208 is in the opened position (e.g., the solenoid valve is moved to the opened position in response to signals transmitted to the solenoid valve 208 by the controller 210), gases may flow from the first chamber 214 to the first vacuum/pressure reservoir (e.g., due to the pressure of gases within the first vacuum/pressure reservoir being maintained at a pressure below atmospheric pressure), and gases may additionally flow from the second vacuum/pressure reservoir to the second chamber 217 (e.g., due to the pressure of gases within the second vacuum/pressure reservoir being maintained at a pressure above atmospheric pressure). Opening the solenoid valve 208 to enable gases to flow in this way results in a pressure differential between the first chamber 214 and second chamber 217. As a result, force is applied to the shift fork 218 via the diaphragm 216 in a direction opposite to the biasing force of the biasing member 220. When the force applied to the shift fork 218 by the gases within the second chamber 217 exceeds the biasing force of the biasing member 220, the shift fork 218 is moved toward the first chamber 214 (e.g., in the direction of the first shaft 224) and the splines of the clutch ring 226 are disengaged with the splines of the second shaft 228. As a result, the second shaft 228 is able to move (e.g., twist) relative to the first shaft 224 (e.g., the second shaft 228 is disengaged from the first shaft 224).

By configuring the decoupler 230 to engage or disengage the second shaft 228 with the first shaft 224 in response to signals transmitted to the solenoid valve 208 as described above, vehicle handling may be increased for a wide variety of driving conditions. For example, the decoupler 230 may be engaged during conditions in which the vehicle is driven on relatively flat surfaces (e.g., roads) in order to reduce a likelihood of tilting or swaying of the vehicle (e.g., while turning the vehicle). The decoupler 230 may be disengaged during conditions in which the vehicle is driven on uneven surfaces (e.g., off-road) in order to increase wheel traction and/or wheel articulation, as described above. In some examples, the controller 210 may engage and/or disengage the decoupler 230 in response to input by an operator of the vehicle (e.g., a driver) via one or more user input devices (e.g., buttons, touchscreens, etc. positioned within a cabin of the vehicle). In other examples, the controller 210 may automatically engage and/or disengage the decoupler 230 in response to vehicle operating conditions (e.g., changes to one or more vehicle parameters such as vehicle speed, wheel position, wheel traction, etc.). In one example, the controller 210 may make a determination of whether the vehicle has transitioned from being driven on a relatively flat surface (e.g., a paved road) to a relatively uneven surface (e.g., an unpaved road or unpaved area) based on the vehicle operating conditions, and may disengage the decoupler 230 in order to increase wheel traction and/or wheel articulation. In another example, responsive to a first vehicle operating condition (e.g., a determination by the controller than the vehicle is on an unpaved road or other uneven surface), the controller 210 may disengage the first shaft and second shaft from each other via the decoupler (e.g., by fluidly coupling the first chamber 214 to the vacuum/pressure reservoir 206 via energizing solenoid valve 208 to move solenoid valve 208 to the opened position and disengage the splines of the clutch ring 226 from the splines of the second shaft 228, as described above in one example), and responsive to a second vehicle operating condition (e.g., a determination by the controller that the vehicle is on a flat surface or paved road), the controller 210 may engage the first shaft and second shaft with each other via the decoupler (e.g., by fluidly isolating the first chamber 214 from the vacuum/pressure reservoir 206 by de-energizing the solenoid valve 208 to move the solenoid valve 208 to the closed position and engage the splines of the clutch ring 226 with the splines of the second shaft 228, as described above). Other examples are possible.

FIG. 3 shows an example of a suspension system 322 of a vehicle, similar to front suspension system 191 and/or rear suspension system 193 of vehicle 100 shown by FIG. 1 and described above. Suspension system 322 includes a stabilizer bar 323 having a first shaft 312 and a second shaft 314, similar to the stabilizer bars described above with reference to FIGS. 1-2. The first shaft 312 and second shaft 314 are each coupled to gas-actuated decoupler 318, similar to decoupler 230 and the decouplers described above (e.g., with reference to FIG. 1). First shaft 312 and second shaft 314 may each be coupled to a frame of the vehicle (e.g., frame 195 of vehicle 100) via fasteners 310 (e.g., brackets). First shaft 312 is coupled to first control arm 330 of first wheel 300 via a first end link 320, and second shaft 314 is coupled to a second control arm 332 of an opposing, second wheel 302 via second end link 320. The first control arm 330 and second control arm 332 are each coupled to the frame of the vehicle via one or more flexible joints or pivots 308 (e.g., bushings). During conditions in which the first wheel 300 is urged upward or downward relative to the second wheel 302 as indicated by arrows 304 and the decoupler 318 is in an engaged mode (as described above with reference to FIG. 2), the first shaft 312 and second shaft 314 may each twist together as indicated by arrow 316. However, during conditions in which the first wheel 300 is urged upward or downward relative to the second wheel 302 as indicated by arrows 304 and the decoupler 318 is in a disengaged mode (as described above with reference to FIG. 2), the first shaft 312 may twist without twisting the second shaft 314. Similarly, during conditions in which the second wheel 302 is urged upward or downward relative to the first wheel 300 as indicated by arrows 306, the second shaft 314 twists the first shaft 312 while the decoupler 318 is in the engaged mode, and the second shaft 314 does not twist the first shaft 312 while the decoupler 318 is in the disengaged mode. An enlarged view of several of the components of the stabilizer bar 323 of FIG. 3 is shown by FIG. 4, with FIG. 4 further showing a ventilation passage 400 (e.g., vacuum tube) of the decoupler 318.

Figure 5:
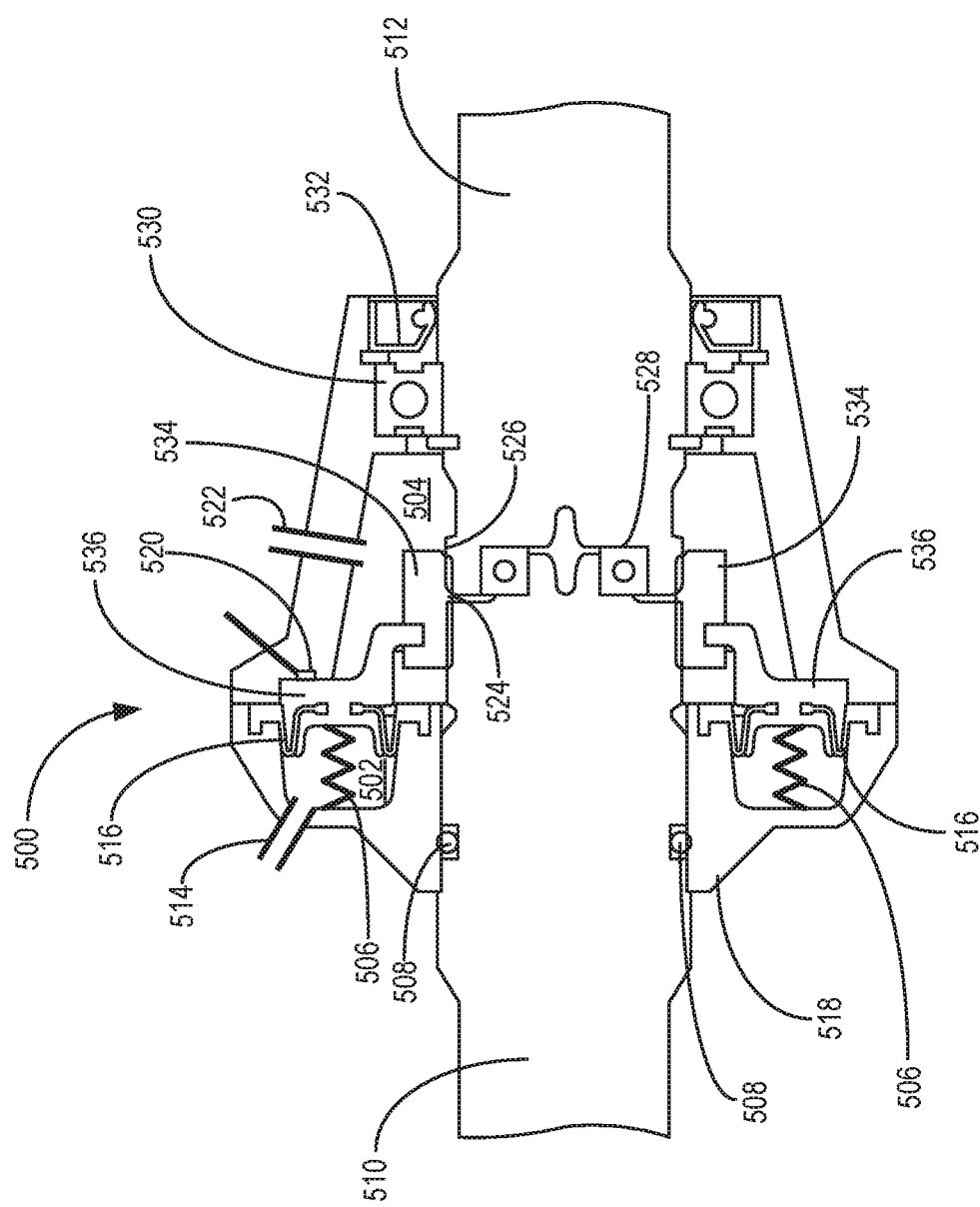
FIG. 5 shows a cross-sectional view of a gas-actuated stabilizer bar shaft decoupler.
Figure 6:
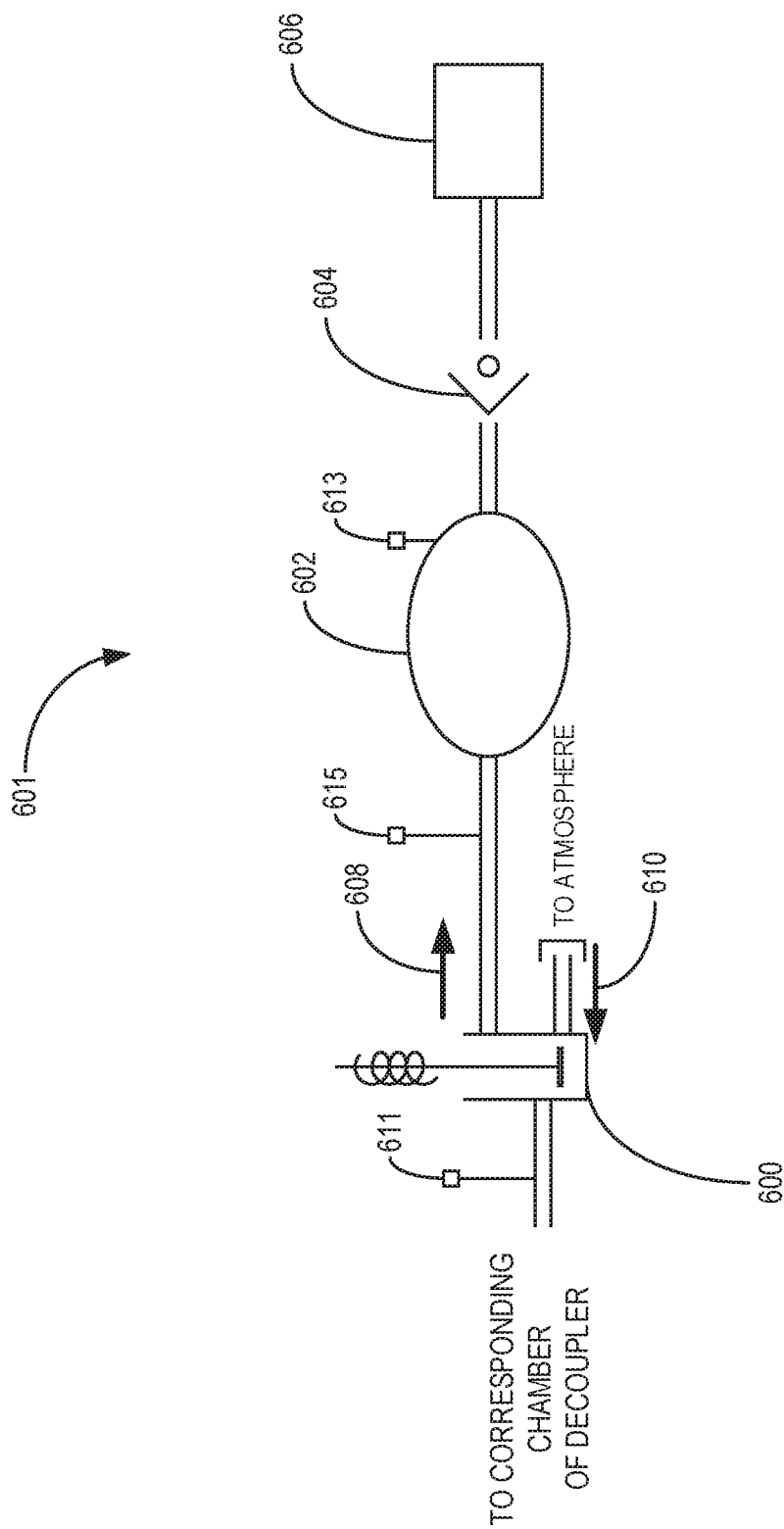
FIG. 6 schematically shows a gas system for a gas-actuated stabilizer bar shaft decoupler.

FIG. 5 shows a gas-actuated decoupler 500 with respect to first shaft 510 and second shaft 512 of a stabilizer bar of a vehicle (e.g., stabilizer bars 197, 199, 323, etc.), similar to the decouplers described above with reference to FIGS. 1-4. For example, decoupler 500 includes a first chamber 502, diaphragm 516, biasing member 506, shift fork 536, clutch ring 534, and second chamber 504, similar to those described above. Decoupler 500 is further shown to include housing 518, o-ring 508, first passage 514 (e.g., first tube or first port), shift fork position sensor 520, bearing 530, bearing 528, seal 532, and second chamber outlet passage 522 (e.g., second port). Clutch ring 534 includes splines 524, and second shaft 512 includes counterpart splines 526, similar to the examples described above. Decoupler 500 may operate similarly to the decouplers described above.

FIG. 6 schematically shows a vacuum/pressure system 601 configured to adjust an amount of gases within a coupled chamber of a decoupler of a stabilizer bar (e.g., a first chamber or second chamber of the decoupler, such as first chamber 214 and second chamber 217 described above). The decoupler may be similar to the decouplers described above (e.g., first decoupler 135, second decoupler 153, decoupler 230, etc.). Vacuum/pressure system 601 includes a solenoid valve 600, vacuum/pressure reservoir 602, check valve 604, and vacuum/pressure source 606, similar to those described above. For example, solenoid valve 600 may be similar to solenoid valve 208, vacuum/pressure reservoir 602 may be similar to vacuum/pressure reservoir 206, check valve 604 may be similar to check valve 204, and vacuum/pressure source 606 may be similar to vacuum/pressure pump 202 (or, in some examples, may be an intake passage or intake manifold of a vehicle, as described above). The vacuum/pressure system 601 may additionally include a plurality of pressure sensors, such as pressure sensor 611, pressure sensor 613, and pressure sensor 615, for measuring a pressure at various locations within the system (e.g., for system diagnostics). For example, pressure sensor 611 may measure gas pressure between the solenoid valve 600 and the decoupler, pressure sensor 613 may measure a pressure of gases within the vacuum/pressure reservoir 602 (e.g., to aid with maintaining the pressure of gases within the vacuum/pressure reservoir 602 at a desired pressure above or below atmospheric pressure), and pressure sensor 615 may measure a pressure of gases between the solenoid valve 600 and the vacuum/pressure reservoir 602.

In one example, during conditions in which solenoid valve 600 is energized (e.g., opened), gases may flow from the first chamber of the decoupler in the direction of the vacuum/pressure reservoir 602 as indicated by arrow 608. During conditions in which solenoid valve 600 is not energized (e.g., is closed), gases (e.g., air) may flow from atmosphere into the first chamber as indicated by arrow 610.

In another example (as described above), the solenoid valve 600 may instead control the flow of gases between the second chamber of the decoupler (e.g., similar to second chamber 217 described above) and the vacuum/pressure reservoir 602. For example, gases within the vacuum/pressure reservoir 602 may be maintained at a pressure higher than atmospheric pressure, and during conditions in which the solenoid valve 600 is energized, gases may flow from the vacuum/pressure reservoir 602 to the second chamber of the decoupler (e.g., in the direction opposite to the direction indicated by arrow 608). During conditions in which the solenoid valve is not energized (e.g., is closed), gases (e.g., air) may flow from the second chamber to atmosphere (e.g., in the direction opposite to the direction indicated by arrow 610).

In yet another example, the solenoid valve 600 may control a flow of gases between the first chamber and a first vacuum/pressure reservoir, and may additionally control a flow of gases between the second chamber and a second vacuum/pressure reservoir, similar to the example described above with reference to FIG. 2. For example, the first vacuum/pressure reservoir may include gases (e.g., air) maintained at a pressure below atmospheric pressure, and the second vacuum/pressure reservoir may include gases maintained at a pressure above atmospheric pressure. During conditions in which the solenoid valve 600 is energized, gases may flow from the first chamber to the first vacuum/pressure reservoir, and gases may additionally flow from the second vacuum/pressure reservoir to the second chamber.

Figure 7:
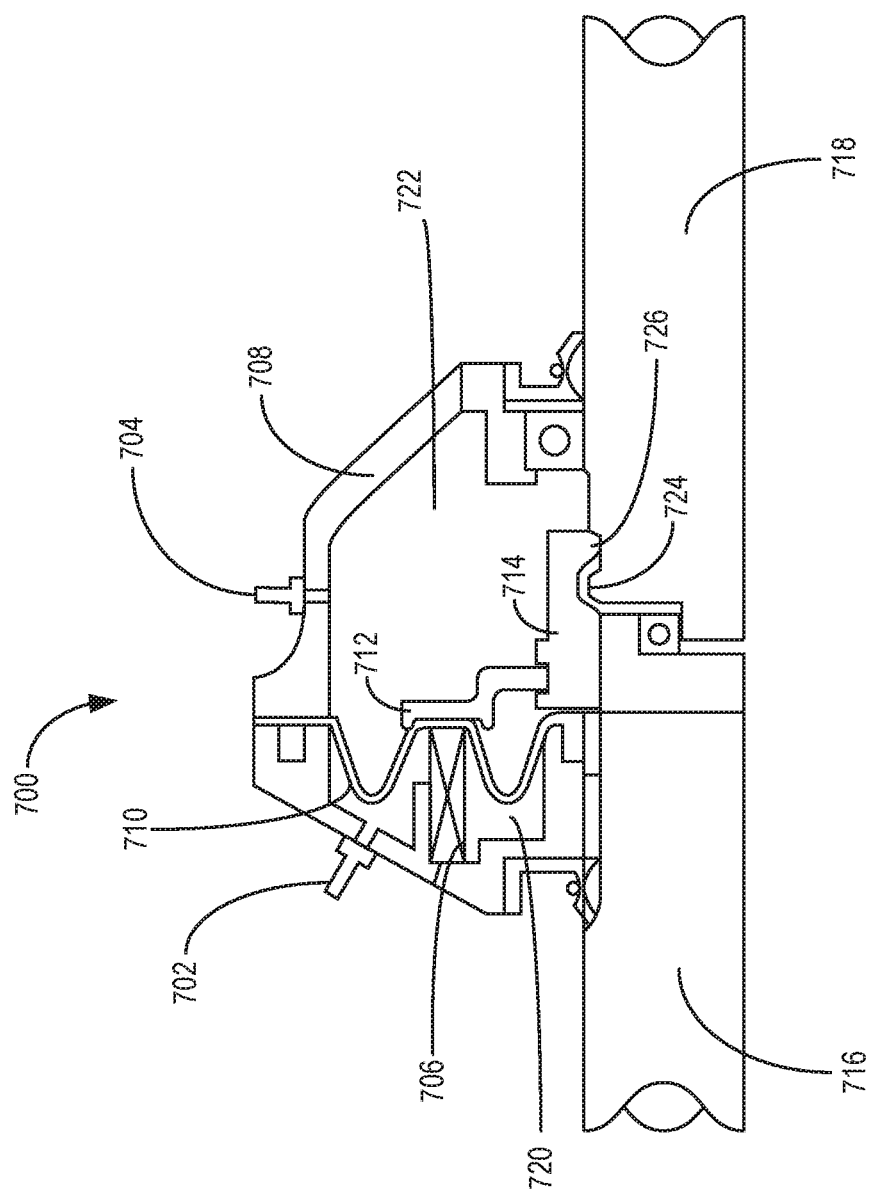
FIG. 7 shows a cross-sectional view of a second example of a gas-actuated stabilizer bar shaft decoupler.

FIG. 7 shows a decoupler 700 of a vehicle stabilizer bar, similar to the decouplers 135 and 153 described above with reference to FIG. 1, decoupler 230 described above with reference to FIG. 2, etc. Decoupler 700 includes diaphragm 710, biasing member 706, first chamber 720, first chamber outlet 702 (e.g., first port), shift fork 712, clutch ring 714 having splines 726, second chamber 722, second chamber outlet 704 (e.g., second port), and housing 708. In some examples, one or more of the components shown by FIG. 7 may be similar to those shown by FIG. 5 and described above. Decoupler 700 is fixedly coupled to first shaft 716 of the stabilizer bar, and second shaft 718 may be locked to the first shaft 716 via engagement of the splines 726 of clutch ring 714 with counterpart splines 724 of the second shaft 718 (e.g., during conditions in which the pressure of gases within the first chamber 720 is decreased relative to atmospheric pressure and/or a pressure of gases within the second chamber 722 is increased relative to the pressure of gases within the first chamber 720, similar to the examples described above).

FIG. 8 illustrates a method 800 for operating a gas-actuated stabilizer bar shaft decoupler, such as the decouplers described above (e.g., decouplers 135, 153, 230, etc.). Instructions for carrying out method 800 and the rest of the methods included herein may be executed by a controller (e.g., controller 12, controller 210, etc.) based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 802, the method includes initialization of a stabilizer bar decoupler control system (e.g., controller). In one example, initialization may include estimating and/or measuring engine and/or vehicle operating conditions such as engine speed, engine torque output, engine operating temperature, vehicle speed and/or wheel speed, vehicle vibration, etc. The controller may receive signals from the various sensors of the vehicle and may estimate and/or measure the engine operating conditions based on the signals. For example, a pulse width of signals from one or more vehicle speed sensors (e.g., wheel speed sensor 113) may be compared to values stored in a lookup table in a non-transitory memory of the controller in order to determine a speed of one or more wheels of the vehicle. In another example, the controller may make a logical determination regarding the wheel speed, with an input being the pulse width and an output being the determined wheel speed.

The method continues from 802 to 804 where the method includes determining a vehicle input command. In one example, the vehicle input command may include signals (e.g., electrical signals) transmitted to the controller to select a mode of a decoupler of a stabilizer bar of the vehicle (e.g., similar to the gas-actuated decouplers described above, such as decouplers 135, 153, 230, etc). In one example, the controller may receive the vehicle input command responsive to a user input (e.g., a selection made by the user via one or more user input devices, such as buttons or touchscreens, to disengage the shafts of the stabilizer bar via the decoupler). In another example, the controller may receive the vehicle input command in response to vehicle operating conditions and/or engine operating conditions, such as reduced wheel traction, vehicle body and/or frame oscillation, etc., and/or the vehicle operating conditions described above with reference to FIG. 2.

The method continues from 804 to 806 where the method includes determining whether stabilizer bar shaft disengagement is desired. For example, the controller may determine whether stabilizer bar shaft disengagement is desired based on the vehicle input command. For example, a pulse width of the signals comprising the vehicle input command (e.g., signals transmitted to the controller via the one or more user input devices) may be compared to values stored in a lookup table in a non-transitory memory of the controller in order to determine whether stabilizer shaft disengagement is desired.

If stabilizer bar shaft disengagement is desired at 806, the method continues to 808 where the method includes determining whether the decoupler is disengaged. In one example, determining whether the decoupler is disengaged may include determining (e.g., measuring) a position of a clutch ring of the decoupler via one or more position sensors (e.g., position sensor 520, etc.) and comparing the determined position to a pre-determined disengaged position of the clutch ring. For example, during conditions in which the shift fork is positioned closer to a first side of the decoupler (e.g., a side of the decoupler positioned closer to a first shaft of the vehicle, similar to first shaft 510 shown by FIG. 5 and described above), the controller may determine that the decoupler is in the disengaged mode (e.g., as described above).

As another example, determining whether the decoupler is disengaged may include determining a mode of the decoupler (e.g., engaged or disengaged) following an immediately prior execution of the method 800. For example, during prior vehicle operation, the decoupler may be operating in the disengaged mode. The operating mode of the decoupler may be stored in non-transitory memory of the controller, and the controller may reference the prior operation of the vehicle (e.g., the most recent operating mode of the decoupler) in order to determine whether the decoupler is disengaged at 808.

If the decoupler is disengaged at 808, the method continues to 814 where the method includes outputting a disengaged signal to the controller. As one example, the disengaged signal may be an electrical signal (e.g., pulse) transmitted to the controller in order to indicate to the controller that the decoupler is operating in the disengaged mode. The controller may store the operating mode of the decoupler in non-transitory memory for reference during following vehicle operations.

If the decoupler is not disengaged at 808, the method continues to 810 where the method includes energizing a solenoid valve coupled to the decoupler. Energizing the solenoid valve may include directing electrical energy to the solenoid valve via one or more batteries or other electrical power sources of the vehicle in order to move the solenoid valve to an opened position (e.g., a position in which the solenoid valve fluidly couples the decoupler to a vacuum or pressure source, such as vacuum/pressure reservoir 602 described above). Energizing the solenoid valve may flow gases between a chamber of the decoupler and a vacuum/pressure reservoir, disengaging the clutch ring of the decoupler from the shaft of the stabilizer bar. For example, as described above, the solenoid valve (e.g., solenoid valve 208) may be energized by the controller to shift the clutch ring toward the first side of the decoupler by adjusting a gas pressure differential between a first chamber and a second chamber of the decoupler. As one example, the solenoid valve may be energized in order to flow gases out of the first chamber to a first vacuum/pressure reservoir, to flow gases into the second chamber from the first vacuum/pressure reservoir, or to flow gases out of the first chamber to the first vacuum/pressure reservoir and flow gases into the second chamber from a second vacuum/pressure reservoir, similar to the examples described above. Disengaging the clutch ring from the shaft enables the shafts of the stabilizer bar to twist independently of each other.

The method continues from 810 to 812 where the method includes determining whether the clutch ring has reached the end of travel. As one example, the controller may determine (e.g., measure) a position of the clutch ring based on an output of the position sensor of the decoupler and may compare the determined position to a pre-determined position of the clutch ring. The pre-determined position may correspond to a position in which the clutch ring is fully disengaged (e.g., splines of the clutch ring are fully disengaged from counterpart splines of a shaft of the stabilizer bar).

If the clutch ring has reached the end of travel at 812, the method continues to 814 where the method includes outputting the disengaged signal to the controller, as described above.

If the clutch ring has not reached the end of travel at 812, the method continues to 816 where the method includes determining whether a shift time has exceeded a threshold amount of time. The shift time may be the amount of time the solenoid valve is energized in order to move the clutch ring to the fully disengaged position, and the threshold time may be a pre-determined amount of time stored in non-transitory memory of the controller (e.g., 3 seconds, 4 seconds, etc.).

If the shift time has not exceeded the threshold amount of time at 816, the method continues to 818 where the method includes continuing to energize the solenoid valve until the clutch ring reaches the end of travel. For example, the solenoid valve may be energized until an output of the position sensor indicates that the clutch ring is in the fully disengaged position.

If the shift time has exceeded the threshold amount of time at 816, the method continues to 820 where the method includes maintaining conditions until a next vehicle input command. As one example, maintaining conditions may include maintaining the position of the clutch ring (e.g., via energization of the solenoid valve), maintaining a gas pressure of the vacuum or pressure source, etc.

If stabilizer bar disengagement is not desired at 806, the method continues to 822 where the method includes determining whether the decoupler is engaged. In one example, determining whether the decoupler is engaged may include determining (e.g., measuring) a position of a clutch ring of the decoupler via one or more position sensors (e.g., position sensor 520, etc.) and comparing the determined position to a pre-determined engaged position of the clutch ring (e.g., the position in which the splines of the clutch ring are engaged with counterpart splines of both shafts of the stabilizer bar). For example, during conditions in which the shift fork is positioned further from the first side of the decoupler (e.g., a side of the decoupler positioned closer to a first shaft of the vehicle, similar to first shaft 510 shown by FIG. 5 and described above), the controller may determine that the decoupler is in the engaged mode.

As another example, determining whether the decoupler is engaged may include determining a mode of the decoupler (e.g., engaged or disengaged) following an immediately prior execution of the method 800. For example, during prior vehicle operation, the decoupler may be operating in the engaged mode. The operating mode of the decoupler may be stored in non-transitory memory of the controller, and the controller may reference the prior operation of the vehicle (e.g., the most recent operating mode of the decoupler) in order to determine whether the decoupler is engaged at 822.

If the decoupler is engaged at 822, the method continues to 828 where the method includes outputting an engaged signal to the controller. As one example, the engaged signal may be an electrical signal (e.g., pulse) transmitted to the controller in order to indicate to the controller that the decoupler is operating in the engaged mode. The controller may store the operating mode of the decoupler in non-transitory memory for reference during following vehicle operations.

If the decoupler is not engaged at 822, the method continues to 824 where the method includes not energizing the solenoid valve coupled to the decoupler. Not energizing the solenoid valve may include not directing electrical energy to the solenoid valve via one or more batteries or other electrical power sources of the vehicle in order to move the solenoid valve to a fully closed position (e.g., a position in which the solenoid valve does not fluidly couple the decoupler to a vacuum or pressure source, such as vacuum/pressure reservoir 602 described above). For example, during conditions in which the solenoid valve is not energized, a biasing member of the decoupler (e.g., biasing member 506 described above) may apply force to a shift fork of the decoupler (e.g., shift fork 536 described above) in order to urge the clutch ring toward the engaged position. By not energizing the solenoid valve, a gas pressure within the first chamber of the decoupler may be approximately a same pressure as a gas pressure within the second chamber of the decoupler (e.g., atmospheric pressure). As a result, the biasing member urges the clutch ring into engagement with the shaft, and the shafts of the stabilizer bar do not twist relative to each other and instead may twist together (e.g., in response to a vertical movement of the respective wheels of the vehicle, as described above).

The method continues from 822 to 826 where the method includes determining whether the clutch ring has reached the end of travel. As one example, the controller may determine (e.g., measure) a position of the clutch ring based on an output of the position sensor of the decoupler and may compare the determined position to a pre-determined position of the clutch ring. The pre-determined position may correspond to a position in which the clutch ring is fully engaged (e.g., splines of the clutch ring are fully engaged with counterpart splines of both shafts of the stabilizer bar).

If the clutch ring has reached the end of travel at 826, the method continues to 828 where the method includes outputting the engaged signal to the controller, as described above.

If the clutch ring has not reached the end of travel at 826, the method continues to 830 where the method includes determining whether the shift time is greater than a threshold amount of time. The shift time may be the amount of time the solenoid valve is not energized in order to move the clutch ring to the fully engaged position (e.g., via the biasing member), and the threshold time may be a pre-determined amount of time stored in non-transitory memory of the controller (e.g., 3 seconds, 4 seconds, etc.).

If the shift time is not greater than the threshold amount of time at 830, the method continues to 832 where the method includes continuing to not energize the solenoid valve until the clutch ring has reached the end of travel. For example, the solenoid valve may be not energized until an output of the position sensor indicates that the clutch ring is moved to the fully engaged position by the force applied to the shift fork and clutch ring by the biasing member.

If the shift time is greater than the threshold amount of time at 830, the method continues to 820 where the method includes maintaining conditions until a next vehicle input command. As one example, maintaining conditions may include maintaining the position of the clutch ring (e.g., via not energizing the solenoid valve), maintaining a gas pressure of the vacuum or pressure source, etc.

FIGS. 9-10 shows another example of a gas-actuated decoupler 900 for a stabilizer bar, similar to the decouplers described above (e.g., decoupler 318, decoupler 230, first decoupler 135, second decoupler 153, decoupler 500, etc.). FIG. 9 shows a view of an exterior of a housing 906 of the decoupler 900, and FIG. 10 shows a cross-sectional view of an interior of the housing 906 of the decoupler 900 along line 912 shown by FIG. 9.

The decoupler 900 includes a first port 908 and a second port 910 each positioned at a same, first side 913 of the housing 906 of the decoupler 900, opposite to second side 917 and across axis 915 extending radially relative to first shaft 902 and second shaft 904. In some examples, the first port 908 and second port 910 may each be coupled to a same hose in order to fluidly couple a first chamber 1000 and a second chamber 1002 within the housing to respective vacuum/pressure reservoirs and/or atmosphere. For example, the hose may include a first fluid passage and a second fluid passage, with the first fluid passage and second fluid passage isolated from each other within an interior of the hose such that fluid (e.g., air) does not flow from the first fluid passage to the second fluid passage (or vice versa). The first fluid passage may be coupled to the first port 908 and the second fluid passage may be coupled to the second port 910. In this configuration, gases may flow from the first chamber 1000 and the second chamber 1002 through the hose without mixing and/or converging.

As one example, the first chamber 1000 may be similar to the first chamber 214, first chamber 502, and/or first chamber 720 described above, and the second chamber 1002 may be similar to the second chamber 217, second chamber 504, and/or second chamber 722 described above. The hose may couple the first chamber 1000 a vacuum/pressure reservoir, similar to the vacuum/pressure reservoirs described above (e.g., vacuum/pressure reservoir 206 shown by FIG. 2 and described above), and the hose may additionally couple the second chamber 1002 to atmosphere, in one example. In another example, the hose may couple the second chamber 1002 a vacuum/pressure reservoir configured to maintain gases (e.g., air) at a pressure above atmospheric pressure, and hose may additionally couple the first chamber 1000 to atmosphere. In yet another example, the hose may couple the first chamber 1000 to a vacuum/pressure reservoir configured to maintain gases at a pressure below atmospheric pressure, and the hose may additionally couple the second chamber 1002 to a second vacuum/pressure reservoir configured to maintain gases at a pressure above atmospheric pressure.

FIG. 10 shows a cross-sectional view of the interior of the housing 906 of the decoupler. The decoupler 900 includes several components similar to the components described above with regard to decoupler 318, decoupler 230, first decoupler 135, second decoupler 153, decoupler 500, etc. For example, seal 1004 and seal 1006 may each be similar to seal 532 shown by FIG. 5, biasing member 1012 may be similar to biasing member 220, biasing member 506, biasing member 706, etc., diaphragm 1014 may be similar to diaphragm 216, diaphragm 516, and/or diaphragm 710 described above, clutch ring 1016 may be similar to clutch ring 226, clutch ring 534, and/or clutch ring 714 described above, shift fork 1018 may be similar to shift fork 218, shift fork 536, and/or shift fork 712 described above, bushing 1020 may be similar to bearing 530 and/or bearing 528, etc. The decoupler 900 further includes a position sensor 1022 configured to measure a position of the clutch ring 1016. The position sensor 1022 may output the measured position of the clutch ring 1016 to an electronic controller, such as controller 210 shown by FIG. 2 and described above.

The first shaft 902 may be similar to the first shaft 127, first shaft 224, first shaft 312, first shaft 510, and/or first shaft 716 described above, and the second shaft 904 may be similar to the second shaft 129, second shaft 228, second shaft 314, second shaft 512, and/or second shaft 718 described above. The clutch ring 1016 includes splines adapted to engage with counterpart splines of an internal drive gear 1008 of the first shaft 902 and an internal drive gear 1010 of the second shaft 904, similar to the splines 726 of the clutch ring 714 configured to engage with counterpart splines 724 described above with reference to FIG. 7. For example, during conditions in which the first shaft 902 is engaged with the second shaft 904 (e.g., similar to the examples described above), the splines of the clutch ring 1016 engage with the counterpart splines of each of the internal drive gear 1008 of the first shaft 902 and the internal drive gear 1010 of the second shaft 904. During conditions in which the first shaft 902 disengages from the second shaft 904 (e.g., similar to the examples described above), the splines of the clutch ring 1016 disengage from the counterpart splines of the internal drive gear 1010 of the second shaft 904 such that the second shaft 904 may move (e.g., rotate, twist, etc.) relative to the first shaft 902. The first shaft 902 and second shaft 904 may disengage from each other responsive to a pressure differential between the first chamber 1000 and second chamber 1002, similar to the examples described above.

In this way, by configuring the decoupler to disengage the shafts of the stabilizer bar via vacuum actuation, a packaging space of the decoupler may be reduced. For example, often a stabilizer bar includes 4 points of contact with the vehicle, which include connections to both control arms or links at the ends of the stabilizer bar, and additionally two points of contact on the vehicle's body or frame that the torsional spring member of the stabilizer bar resides between. Some disconnecting sway bar systems utilize an additional connection point to the vehicle that prevents a disconnect actuator (e.g., decoupler) from rotating as the stabilizer bar rotates through the suspension's range of travel. However, such configurations often have both pieces of the stabilizer bar coupled to the disconnect actuator to include 3 or more bearings or bushings that allow the stabilizer bar to twist. By coupling the actuator housing to one shaft of the stabilizer bar and using bearings or bushings to allow movement to the other shaft, one or more bearings, bushings, or seals may be eliminated, as well as reducing the addition connection point to the vehicle.

The technical effect of disengaging the shafts of the stabilizer bar from each other via the gas-actuated decoupler is to selectably enable the opposing wheels of the vehicle to shift vertically upward and/or downward relative to each other.

In one embodiment, a decoupler for a vehicle wheel stabilizer bar comprises: a housing forming a first chamber and a second chamber therein; a flexible diaphragm fluidly isolating the first chamber from the second chamber; a shift fork coupling the diaphragm to a clutch ring disposed within the housing; and a biasing member biasing the shift fork away from the first chamber. In a first example of the decoupler, the decoupler further comprises a first port fluidly coupling the first chamber to a vacuum/pressure source via a valve, and a second port fluidly coupling the second chamber to atmosphere. A second example of the decoupler optionally includes the first example, and further includes wherein the clutch ring includes a plurality of splines shaped to engage with counterpart splines of a shaft of the stabilizer bar. A third example of the decoupler optionally includes one or both of the first and second examples, and further includes a position sensor configured to measure a position of the shift fork. A fourth example of the decoupler optionally includes one or more or each of the first through third examples, and further includes wherein the housing is configured to fixedly couple to a shaft of the stabilizer bar via a bearing or bushing.

In one embodiment, a method for a decoupler of a vehicle wheel stabilizer bar comprises: in a first mode, flowing gases out of a first chamber of the decoupler to disengage a first shaft of the stabilizer bar from a second shaft of the stabilizer bar; and in a second mode, flowing gases into the first chamber to lock the first shaft to the second shaft. In a first example of the method, the method further includes wherein flowing gases out of the first chamber includes energizing a solenoid valve fluidly coupling the first chamber to a vacuum/pressure reservoir of a vehicle. A second example of the method optionally includes the first example, and further includes wherein disengaging the first shaft of the stabilizer bar from the second shaft includes shifting a clutch ring of the decoupler away from the second shaft. A third example of the method optionally includes one or both of the first and second examples, and further includes wherein shifting the clutch ring away from the second shaft includes disengaging splines of the clutch ring from counterpart splines of the second shaft. A fourth example of the method optionally includes one or more or each of the first through third examples, and further includes wherein flowing gases into the first chamber causes a biasing member of the decoupler to press splines of a clutch ring of the decoupler into engagement with counterpart splines of the second shaft.

In one embodiment, a system comprises: a vehicle frame; a wheel stabilizer bar coupled to the vehicle frame, the stabilizer bar including a first shaft coupled to a first control arm of a first wheel and a second shaft coupled to a second control arm of an opposing, second wheel; a gas-actuated decoupler positioned between the first shaft and second shaft, wherein a portion of the first shaft and a portion of the second shaft is housed within a housing of the decoupler; and a vacuum/pressure source fluidly coupleable to a first chamber of the decoupler via a valve. In a first example of the system, the system further includes wherein the vacuum/pressure source is an intake manifold of an engine of the vehicle. A second example of the system optionally includes the first example, and further includes wherein the vacuum/pressure source is a vacuum/pressure reservoir of the vehicle, the vacuum/pressure reservoir fluidly coupled to a vacuum/pressure pump. A third example of the system optionally includes one or both of the first and second examples, and further includes wherein the housing of the decoupler is fixedly coupled to the first shaft, and wherein the decoupler includes a clutch ring configured to lock the first shaft to the second shaft. A fourth example of the system optionally includes one or more or each of the first through third examples, and further includes wherein the clutch ring includes a plurality of splines shaped to engage with counterpart splines of the second shaft. A fifth example of the system optionally includes one or more or each of the first through fourth examples, and further includes wherein the clutch ring is biased toward the second shaft by a biasing member disposed within the housing.

In another embodiment, a system comprises: a stabilizer bar decoupler including a first chamber and a second chamber disposed therein; a flexible diaphragm fluidly isolating the first chamber from the second chamber; a shift fork coupling the diaphragm to a clutch ring disposed within the housing; and a biasing member adapted to bias the shift fork away from the first chamber.

In another embodiment, a system comprises: a vehicle including a stabilizer bar; a decoupler coupled to the stabilizer bar, the decoupler adapted to disengage opposing shafts of the stabilizer bar from each other in response to vacuum provided to the decoupler by a vacuum/pressure source; and an electronic controller of the vehicle in electronic communication with a valve fluidly coupling the decoupler to the vacuum/pressure source, the controller including instructions stored in non-transitory computer memory for adjusting a position of the valve responsive to a vehicle operating condition.

In another embodiment, a method comprises: responsive to a first vehicle operating condition, disengaging opposing shafts of a sway bar from each other by providing vacuum from a vacuum/pressure source to a decoupler of the sway bar; and responsive to a second vehicle operating condition, engaging the opposing shafts of the sway bar with each other by fluidly isolating the decoupler from the vacuum/pressure source. In a first example of the method, the method further includes wherein providing vacuum from the vacuum/pressure source to the decoupler includes adjusting a valve fluidly coupling the decoupler to the vacuum/pressure source to an opened position, the valve being adjusted responsive to electrical signals transmitted to the valve by an electronic controller of the vehicle. A second example of the method optionally includes the first example, and further includes wherein fluidly isolating the decoupler from the vacuum/pressure source includes adjusting a valve fluidly coupled to each of the decoupler and the vacuum/pressure source to a closed position, the valve being adjusted responsive to electrical signals transmitted to the valve by an electronic controller of the vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A decoupler for a vehicle wheel stabilizer bar, comprising:
a housing forming first and second chambers therein;
a diaphragm fluidly isolating the first chamber from the second chamber;
a shift fork coupling the diaphragm to a clutch ring disposed within the housing; and
a biasing member biasing the shift fork against the clutch ring.

2. The decoupler of claim 1, further comprising a first port fluidly coupling the first chamber to a valve, the valve fluidly coupled to a first vacuum or pressure source.

3. The decoupler of claim 2, further comprising a second port fluidly coupling the second chamber to a second vacuum or pressure source or to atmosphere.

4. The decoupler of claim 3, wherein the first port and second port are positioned at a same side of the housing.

5. The decoupler of claim 3, further comprising a hose coupling each of the first port to the valve and the second port to the second vacuum or pressure source or to atmosphere.

6. The decoupler of claim 1, wherein the clutch ring includes a plurality of splines shaped to engage with counterpart splines of a shaft of the stabilizer bar.

7. The decoupler of claim 1, further comprising a position sensor configured to measure a position of the shift fork.

8. The decoupler of claim 1, wherein the housing is configured to fixedly couple to a shaft of the stabilizer bar via a bearing or bushing.

9. A system, comprising:
a vehicle frame;
a wheel stabilizer bar coupled to the vehicle frame, the stabilizer bar including a first shaft coupled to a first control arm of a first wheel and a second shaft coupled to a second control arm of an opposing, second wheel;
a gas-actuated decoupler positioned between the first shaft and second shaft, wherein a portion of the first shaft and a portion of the second shaft is housed within a housing of the decoupler; and
a first vacuum or pressure source fluidly coupleable to a first chamber of the decoupler via a valve,
wherein the first vacuum or pressure source is an intake manifold of an engine of the vehicle.

10. The system of claim 9, wherein the first vacuum or pressure source is a reservoir of the vehicle, the reservoir fluidly coupled to a vacuum or pressure pump.

11. The system of claim 9, wherein the housing of the decoupler is fixedly coupled to the first shaft, and wherein the decoupler includes a clutch ring configured to lock the first shaft to the second shaft.

12. The system of claim 11, wherein the clutch ring includes a plurality of splines shaped to engage with counterpart splines of the second shaft.

13. The system of claim 11, wherein the clutch ring is biased toward the second shaft by a biasing member disposed within the housing.

14. The system of claim 9, further comprising a second vacuum or pressure source fluidly coupled to a second chamber of the decoupler, where a gas pressure of the first vacuum or pressure source is maintained below atmospheric pressure and a gas pressure of the second vacuum or pressure source is maintained above atmospheric pressure.

* * * * *